United States Patent [19]
Nagai et al.

[11] Patent Number: 5,967,193
[45] Date of Patent: Oct. 19, 1999

[54] FLEXIBLE PIPE UNIT FOR USE IN EXHAUST PIPE LINE OF AUTOMOTIVE ENGINE

[75] Inventors: Tadashi Nagai, Kanagawa; Eizo Suyama, Tokyo; Syoji Watanabe; Seiji Katou, both of Yokohama; Toshiaki Kimura, Kanagawa; Kazuo Yajima, Tokyo; Hiroyuki Aihara, Kanagawa; Seiichi Nitta, Yokohama; Yoshiaki Koizumi; Hidetaka Higashimura, both of Kanagawa; Ryo Mashimo, Yokohama, all of Japan

[73] Assignee: Calsonic Corporation, Tokyo, Japan

[21] Appl. No.: 08/865,639

[22] Filed: May 29, 1997

[30] Foreign Application Priority Data

| May 29, 1996 | [JP] | Japan | 8-134529 |
| May 29, 1996 | [JP] | Japan | 8-134891 |
| Sep. 25, 1996 | [JP] | Japan | 8-252707 |
| Oct. 24, 1996 | [JP] | Japan | 8-282354 |
| Dec. 20, 1996 | [JP] | Japan | 8-340926 |
| Mar. 18, 1997 | [JP] | Japan | 9-064744 |
| Mar. 25, 1997 | [JP] | Japan | 9-070954 |
| Mar. 27, 1997 | [JP] | Japan | 9-074788 |

[51] Int. Cl.$^6$ ........................... F16L 57/00
[52] U.S. Cl. ............ 138/110; 138/112; 138/114; 138/120; 138/155
[58] Field of Search ............ 138/110, 112, 138/114, 120, 155; 285/227, 45, 299, 301

[56] References Cited

U.S. PATENT DOCUMENTS

| 3,038,553 | 6/1962 | Peters | 138/120 |
| 3,369,829 | 2/1968 | Hopkins. | |
| 3,901,539 | 8/1975 | Ijzerman | 138/120 |
| 4,243,253 | 1/1981 | Rogers, Jr. | 285/45 |
| 4,315,558 | 2/1982 | Katayama | 138/120 |
| 4,345,430 | 8/1982 | Pallo et al. | 138/149 |
| 4,598,428 | 7/1986 | Vykukal | 138/120 |
| 5,248,170 | 9/1993 | Francis | 138/120 |
| 5,740,839 | 4/1998 | Kuo et al. | 138/120 |

FOREIGN PATENT DOCUMENTS

| 0 274 144 | 7/1988 | European Pat. Off. . |
| 0 645 528 | 3/1995 | European Pat. Off. . |
| 2 323 944 | 9/1975 | France . |
| 2 418 333 | 2/1978 | France . |
| 44 17 407 | 11/1995 | Germany . |
| 61-187916 | 11/1986 | Japan . |
| 2-14418 | 1/1990 | Japan . |
| 4-6523 | 1/1992 | Japan . |

*Primary Examiner*—James F. Hook
*Attorney, Agent, or Firm*—Foley & Lardner

[57] ABSTRACT

A flexible pipe unit for an exhaust pipe line of an internal combustion engine comprises a metal bellows which has a front open end adapted to be connected to a first exhaust pipe and a rear open end adapted to be connected to a second exhaust pipe. A cylindrical outer case of metal is coaxially disposed about the metal bellows in a manner to define therebetween a cylindrical space. A first structure is arranged between a front end of the outer case and a front end of the bellows to achieve a mechanical connection therebetween. A second structure is arranged between a rear end of the outer case and a rear end of the bellows to achieve a mechanical connection therebetween. At least one of the first and second structures comprises a spring member by which the bellows and the outer case are resiliently connected.

27 Claims, 25 Drawing Sheets

COMPRESSION
⇩

GREATER
SPRING
CONSTANT

EXPANSION
⇧

SMALLER
SPRING
CONSTANT

FLEXIBLE PIPE UNIT FOR USE IN EXHAUST PIPE LINE OF AUTOMOTIVE ENGINE

BACKGROUND OF THE INVENTION

1. Field of the Invention

The present invention relates in general to exhaust systems of automotive engines, and more particularly to a flexible pipe unit installed in an exhaust pipe line of the automotive engine for absorbing or compensating an inevitable dimensional change of the exhaust pipe line during practical use of the same. More specifically, the present invention is concerned with a flexible pipe unit interposed between the front and rear pipe parts of an exhaust pipe of the automotive engine for compensating a relative displacement between the two pipes.

2. Description of the Prior Art

In order to clarify the task of the present invention, some of conventional flexible pipe units of the above-mentioned type will be briefly described in the following with reference to FIGS. 34, 35 and 36 of the accompanying drawings.

Referring to FIG. 34, there is shown a conventional flexible pipe unit which is shown in Japanese Utility Model Provisional Publication 61-187916. The unit of this publication comprises a metal bellows 100 having axial ends connected to front and rear pipe parts 102 and 104 of an exhaust pipe of an automotive engine (not shown) respectively.

For ease of understanding, the front and rear pipe parts 102 and 104 of the exhaust pipe will be designated by front and rear exhaust pipes in the following.

An outer cover 106 of copper mesh houses therein the bellows 100 having axial ends thereof slidably put on axial ends of the bellows 100 respectively. Protectors 108a and 108b of metal are spot-welded to the front and rear exhaust pipes 102 and 104 in a manner to cover and protect the ends of the outer cover 106. When the unit is subjected to a dimensional change of the exhaust pipe line, the bellows 100 absorbs the change. During this, the axial ends of the outer cover 106 slide on the ends of the bellows 100 thereby having no effect on the outer cover 106.

In FIG. 35, there is shown another conventional flexible pipe unit which is shown in Japanese Utility Model Provisional Publication 2-14418. The unit of this publication comprises a metal bellows 100 having first and second metal collars 110a and 110b welded to both ends thereof respectively. The first and second end collars 110a and 110b are to be welded to the front and rear exhaust pipes 102 and 104 respectively. A plurality of spring wires 112 are arranged to extend between the first and second end collars 110a and 110b. When the unit is subjected to a dimensional change of the exhaust pipe line, the bellows 100 absorbs the change. During this, the spring wires 112 bias the first and second metal collars 110a and 110b toward each other.

In FIG. 36, there is shown still another conventional flexible pipe unit which is shown in Japanese Utility Model Provisional Publication 4-6523. The unit of this publication comprises a metal bellows 100 having axial ends connected to the front and rear exhaust pipes 102 and 104 respectively. An outer cover 106 of stainless mesh houses therein the bellows 100. A rear axial end of the outer cover 106 is welded to the rear exhaust pipe 104, while a front axial end of the outer cover 106 is slidably put on the front end of the bellows 100. The front axial end of the outer cover 106 has a spring retainer 114 connected thereto. The spring retainer 114 has an annular flange part received in an annular housing 116 secured to the front exhaust pipe 102. A plurality of compression springs 118 are received in the annular housing 116, which are compressed between the flange part of the spring retainer 114 and one wall of the annular housing 116. When the unit is subjected to a dimensional change of the exhaust pipe line, the bellows 100 absorbs the change. During this, the front axis end of the outer cover 106 slides on the fixed front end of the bellows 100 thereby having no effect on the outer cover 106.

However, due to inherent construction, the above-mentioned conventional flexible pipe units have various drawbacks which are as follows.

That is, the unit of FIG. 34 is costly due to usage of the outer cover 106 made of copper mesh. Furthermore, for the same reason, the unit is heavy in weight, which induces the need of usage of robust and thus costly holder devices through which the exhaust pipe line is supported from a vehicle floor. Furthermore, as is shown by the graph of FIG. 21, the unit fails to exhibit a satisfied dimensional change compensating performance. In fact, the unit tends to show unstable compensating performance when it is expanded. In the unit of FIG. 35, the bellows 100 and the spring wires 112 are bared and thus tend to be deformed or damaged by foreign objects such as stones during running of an associated motor vehicle. The unit of FIG. 36 is costly due to usage of the outer cover 106 which is made of stainless mesh. Furthermore, due to usage of various and numerous parts, the unit is complicated in construction and heavy in weight.

SUMMARY OF THE INVENTION

It is therefore an object of the present invention to provide a flexible pipe unit for use in an exhaust pipe line of an automotive engine, which is free of the above-mentioned drawbacks.

According to a first aspect of the present invention, there is provided a flexible pipe unit which is to be interposed between aligned first and second exhaust pipes of an internal combustion engine. The flexible pipe unit a metal bellows having a front open end adapted to be connected to the first exhaust pipe and a rear open end adapted to be connected to the second exhaust pipe; a cylindrical outer case of metal coaxially disposed about the metal bellows with a cylindrical space defined therebetween; a first structure arranged between a front end of the outer case and a front end of the bellows to achieve a mechanical connection therebetween; and a second structure arranged between a rear end of the outer case and a rear end of the bellows to achieve a mechanical connection therebetween, wherein at least one of the first and second structures comprises a spring member by which the bellows and the outer case are resiliently connected.

According to a second aspect of the present invention, there is provided a flexible pipe unit which is to be interposed between aligned first and second exhaust pipes of an internal combustion engine. The flexible pipe unit comprises a metal bellows having a front open end adapted to be connected to the first exhaust pipe and a rear open end adapted to be welded to the second exhaust pipe; a cylindrical outer case of metal coaxially disposed about the bellows in a manner to define therebetween a cylindrical space; an annular front cover extending between the front open end of the bellows and a front end of the outer case to achieve a united connection therebetween; a spring holder welded to the rear open end of the bellows; a coil spring having one end held by the spring holder and the other end held by a rear end of the outer case; and an inner pipe coaxially extending in the bellows from one of the front and rear open ends of the bellows toward the other open end leaving a certain space between the leading end of the inner pipe and the other open end thereby to cause a cylindrical chamber defined between the bellows and the inner pipe to serve as a resonance chamber.

According a third aspect of the present invention, there is provided a flexible pipe unit which is to be interposed between aligned first and second exhaust pipes of an internal combustion engine. The flexible pipe unit comprises a metal bellows having a front open end adapted to be connected to the first exhaust pipe and a rear open end adapted to be connected to the second exhaust pipe; a cylindrical outer case of metal coaxially disposed about the bellows in a manner to define therebetween a cylindrical space; first and second spring holders welded to the front and rear open ends of the bellows respectively; a first coil spring having one end held by the first spring holder and the other end held by a front end of the outer case; a second coil spring having one end held by the second spring holder and the other end held by a rear end of the outer case; and an inner pipe coaxially extending in the bellows from one of the front and rear open ends of the bellows toward the other open end leaving a certain space between the leading end of the inner pipe and the other open end thereby to cause a cylindrical chamber defined between the bellows and said inner pipe to serve as a resonance chamber.

BRIEF DESCRIPTION OF THE DRAWINGS

Other objects and advantages of the present invention will become apparent from the following description when taken in conjunction with the accompanying drawings, in which:

FIG. 25C-1, 25C-2 and 25C-3 are sectional views respectively showing modifications of a spring catcher used in the fifteenth embodiment;

FIGS. 25D-1, 25D-2 and 25D-3 are sectional views respectively showing modifications of a connecting bolt used in the fifteenth embodiment;

DETAILED DESCRIPTION OF EMBODIMENTS

Figure 1:
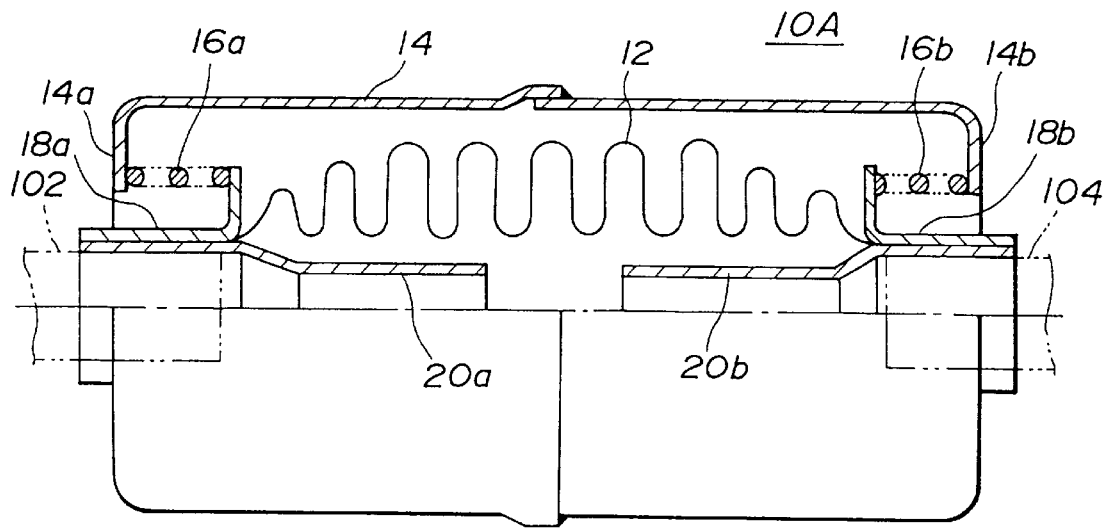
FIG. 1 is a sectional view of a flexible pipe unit which is a first embodiment of the present invention.

Referring to FIG. 1, there is shown a flexible pipe unit 10A which is a first embodiment of the present invention.

Figure 2:
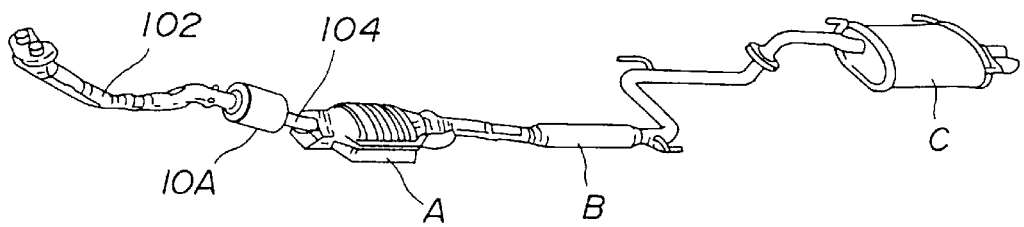
FIG. 2 is a perspective view of an exhaust pipe line of an automotive engine, which has the flexible pipe unit of the first embodiment operatively installed therein.

As is understood from FIG. 2, the unit 10A is a conduit member to be arranged between an front exhaust pipe 102 and a rear exhaust pipe 104 of an exhaust pipe line of an automotive engine (not shown). In this drawing, denoted by references A, B and C are a converter, a sub-muffler and a main muffler which are installed in the exhaust pipe line.

Referring back to FIG. 1, the unit 10A generally comprises a metal bellows 12, a cylindrical outer case 14, first and second cylindrical springs 16a and 16b, first and second annular spring holders 18a and 18b of metal and first and second inner pipes 20a and 20b.

That is, the bellows 12 is coaxially received in the cylindrical outer case 14 and has axial ends which are welded to diametrically enlarged end portions of the first and second inner pipes 20a and 20b respectively. Diametrically reduced end portions of these two inner pipes 20a and 20b are installed in the bellows 12 and aligned with each other with a certain space kept therebetween. The first and second spring holders 18a and 18b are welded on the enlarged end portions of the two inner pipes 20a and 20b. Each of the spring holders 18a and 18b has a raised annular flange part which faces to an apertured axial end wall 14a or 14b of the outer case 14. Each of the first and second cylindrical springs 16a and 16b is compressed between the raised annular flange part of the spring holder 18a or 18b and the end wall 14a or 14b. Axial ends of each cylindrical spring 16a or 16b are secured to the annular flange part and the end wall through welding, caulking or the like. The cylindrical outer case 14 shown is constructed by coupling two cylindrical parts. As shown, in use, the front pipe 102 is put in and welded to the first inner pipe 20a and the rear pipe 104 is put in and welded to the second inner pipe 20b.

Preferably, the bellows 12 is constructed of a laminated stainless steel plate consisting of two stainless sheets each having about 0.2 mm thickness. With usage of the laminated stainless plate, the number of ridges of the bellows 12 can be reduced to 8 or 9. Each cylindrical part of the outer case 14 is provided through a deep drawing technique. The first and second cylindrical springs 16a and 16b are identical in shape and characteristic.

When, in use, the exhaust pipe line is subjected to a certain dimensional change inducing a certain relative displacement between the front and rear pipes 102 and 104, the bellows 12 is forced to expand or contract to absorb or compensate the dimensional change. Due to usage of the springs 16a and 16b arranged in the above-mentioned manner, the expansion and contraction of the bellows 12 has substantially no effect on the cylindrical outer case 14. This dimensional change compensating operation will be described in detail hereinafter.

Figure 3:
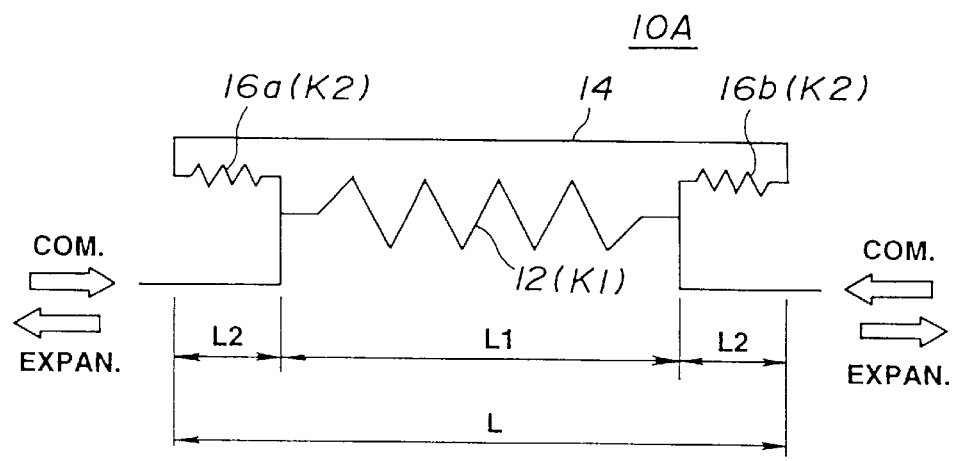
FIG. 3 is a schematic diagram showing the dimensional change compensating performance possessed by the flexible pipe unit of the first embodiment.

A spring constant "K" of the flexible pipe unit 10A is represented by the following equation (1). The equation (1) is easily derived when the unit 10A is schematically illustrated like the manner as shown by FIG. 3.

$$K=K1+(K2/2) \quad (1)$$

wherein:

K1: spring constant of bellows 12

K2: spring constant of cylindrical springs 16a and 16b

From the equation (1), it is apparent that the spring constant "K" of the unit 10A becomes known when the spring constant "K1" of the bellows 12 and the spring constant "K2" of the cylindrical spring 16a or 16b are known. Thus, even when the bellows 12 is constructed to have a smaller or larger spring constant, the unit 10A can have a desired spring constant by selecting suitable cylindrical springs 16a and 16b.

When, under running of an associated motor vehicle, a dimensional change occurs in the exhaust pipe line in a direction to reduce the distance between the front and rear pipes 102 and 104, the bellows 12 is compressed and the cylindrical springs 16a and 16b are expanded.

While, when the dimensional change occurs in the other direction to increase the distance between the front and rear pipes 102 and 104, the bellows 12 is expanded and the cylindrical springs 16a and 16b are compressed.

Thus, when the vehicle is running, the exhaust pipe line is subjected to vibration inducing a repeated dimensional change in distance between the front and rear pipes 102 and 104, the abovementioned expansion and contraction are alternatively and repeatedly carried out in the unit 10A thereby compensating for the dimensional change smoothly.

Due to usage of the springs 16a and 16b, any stress and load applied to the bellows 12 from the front and rear pipes 102 and 104 can be smoothly and effectively reduced. Furthermore, due to presence of the spring 16a and 16b, undesired excessive expansion of the bellows 12 is suppressed. That is, upon marked expansion of the bellows 12, the cylindrical springs 16a and 16b are fully compressed to constitute a fixed structure serving as stopper means. Due to usage of the outer case 14, the bellows 12 and the cylindrical springs 16a and 16b are protected from foreign things such as bumped stones and the like during running of the vehicle.

Due to usage of the two inner pipes 20a and 20b in the bellows 12, a limited space defined therebetween can serve as a resonant box, and thus a certain noise reduction for the exhaust gas is achieved by the unit 10A. Due to usage of the inner pipes 20a and 20b, the heat of the exhaust gas flowing in the unit 10A is not directly transmitted to the bellows 12. If desired, one of the inner pipes 20a and 20b may be removed. In this modification, the remaining inner pipe 20a or 20b has an increased length.

Figure 4:
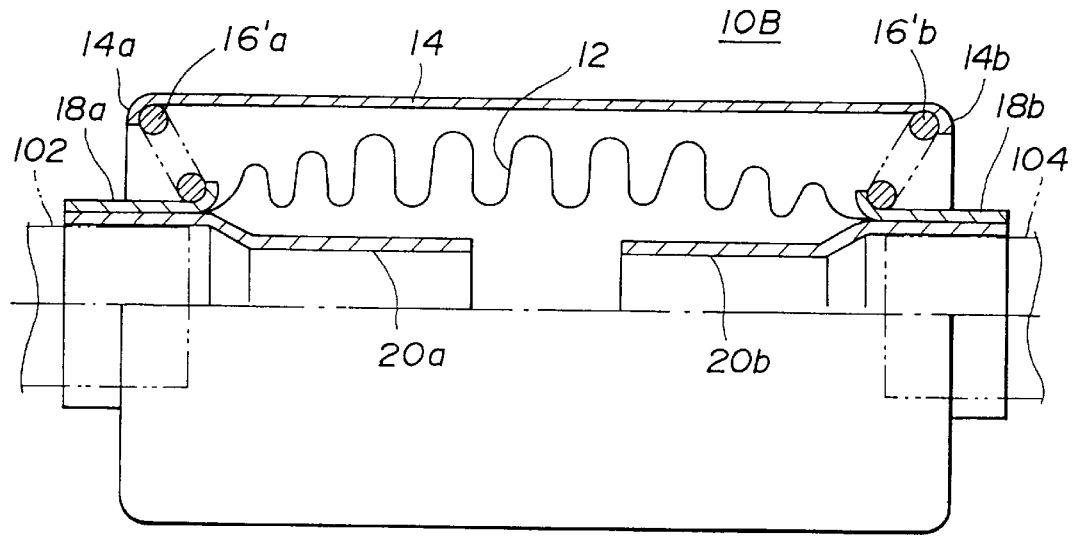
FIG. 4 is a view similar to FIG. 1, but showing a second embodiment of the present invention.

Referring to FIG. 4, there is shown a flexible pipe unit L0B which is a second embodiment of the present invention.

Since the unit 10B is similar to the unit 10A, only parts and portions which are different from those of the unit 10A will be described in the following.

As is shown in FIG. 4, in this second embodiment 10B, conical springs 16'a and 16'b are used in place of the cylindrical springs 16a and 16b employed in the first embodiment 10A. Due to usage of the conical springs 16'a and 16'b, the cylindrical outer case 14 can be made by one cylindrical part. As shown, each conical spring 16'a or 16'b has a diametrically smaller end held by the raised annular flange part of the spring holder 18a or 18b and a diametrically larger end held by a curled edge 14a or 14b of the case 14.

Figure 5:
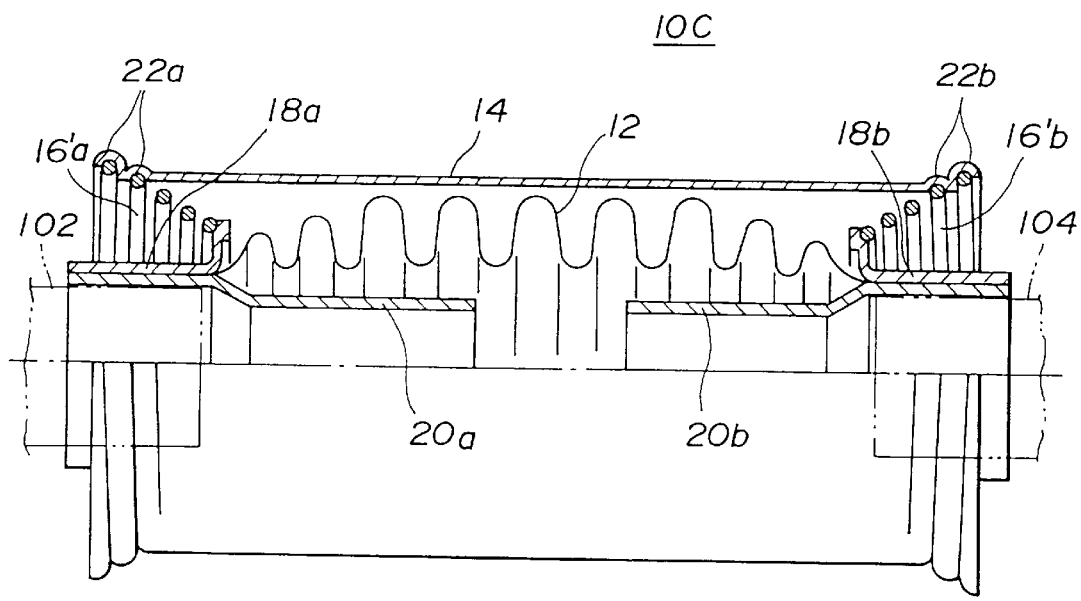
FIG. 5 is a view similar to FIG. 1, but showing a third embodiment of the present invention.

Referring to FIG. 5, there is shown a flexible pipe unit 10C which is a third embodiment of the present invention.

Since the unit 10C is similar to the above-mentioned unit 10B, only parts and portions which are different from those of the unit 10B will be described in the following.

As is seen from FIG. 5, in this third embodiment 10C, the cylindrical outer case 14 is formed at each axial end portion thereof with spiral grooves 22a or 22b. For production of such spiral grooves 22a or 22b, the axial end portions of the case 14 are somewhat expanded radially outward. Upon assembly, the spiral grooves 22a or 22b neatly accommodate the diametrically larger end elements of the conical spring 16'a or 16'b. That is, a so-called screw plug/socket structure is thus defined by the conical spring 16'a or 16'b and the spiral grooves 22a or 22b. If desired, such a screw plug/socket structure may be provided at only one end of the cylindrical outer case 14. Each spring holder 18a or 18b has at the raised annular flange part an annular recess into which the diametrically smaller end of the conical spring 16'a or 16'b is intimately received.

Figure 6:
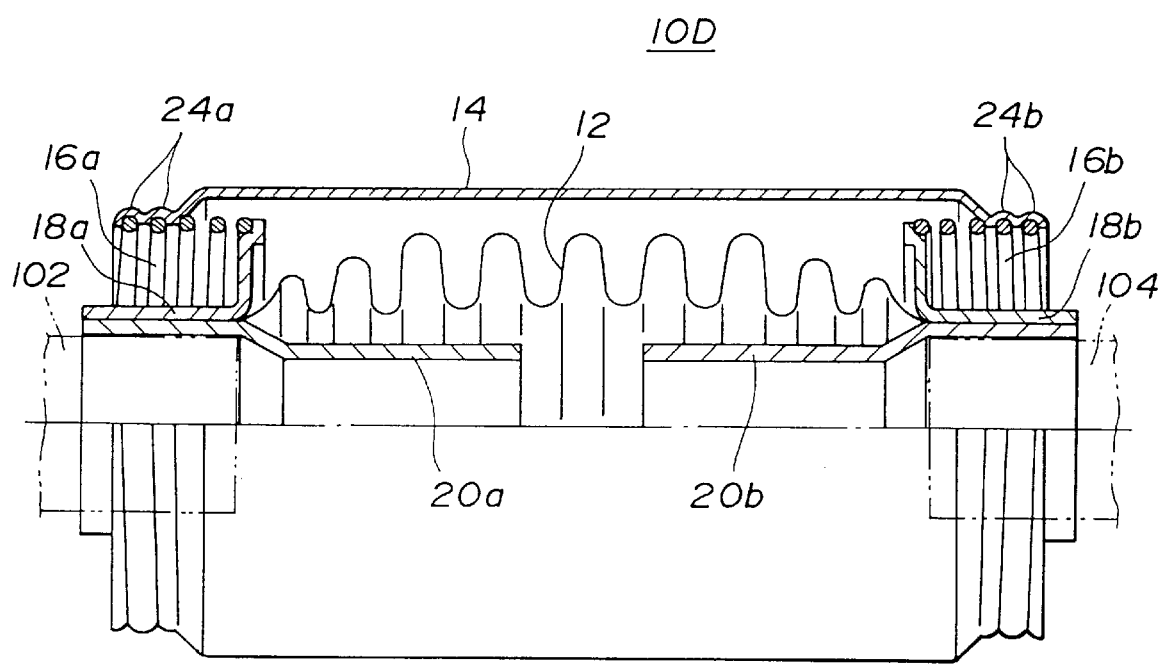
FIG. 6 is a view similar to FIG. 1, but showing a fourth embodiment of the present invention.

Referring to FIG. 6, there is shown a flexible pipe unit 10D which is a fourth embodiment of the present invention.

Since the unit 10D is similar to the afore-mentioned unit 10A of the first embodiment, only parts and portions which are different from those of the unit 10A will be described in the following.

As is seen from FIG. 6, in this fourth embodiment 10D, the cylindrical outer case 14 is formed at each axial end portion thereof with cylindrical grooves 24a or 24b. The axial end portions of the case 14 where the grooves 24a and 24b are formed are reduced somewhat in diameter. Upon assembly, the grooves 24a or 24b neatly accommodate the axially outer end elements of the cylindrical spring 16a or 16b. A so-called screw plug/socket structure is thus defined by the cylindrical spring 16a or 16b and the cylindrical grooves 24a or 24b. If desired, such a screw plug/socket structure may be provided at only one end of the cylindrical outer case 14. Each spring holder 18a or 18b has at the raised annular flange part an annular recess into which an axially innermost element of the spring 16a or 16b is intimately received.

Figure 7:
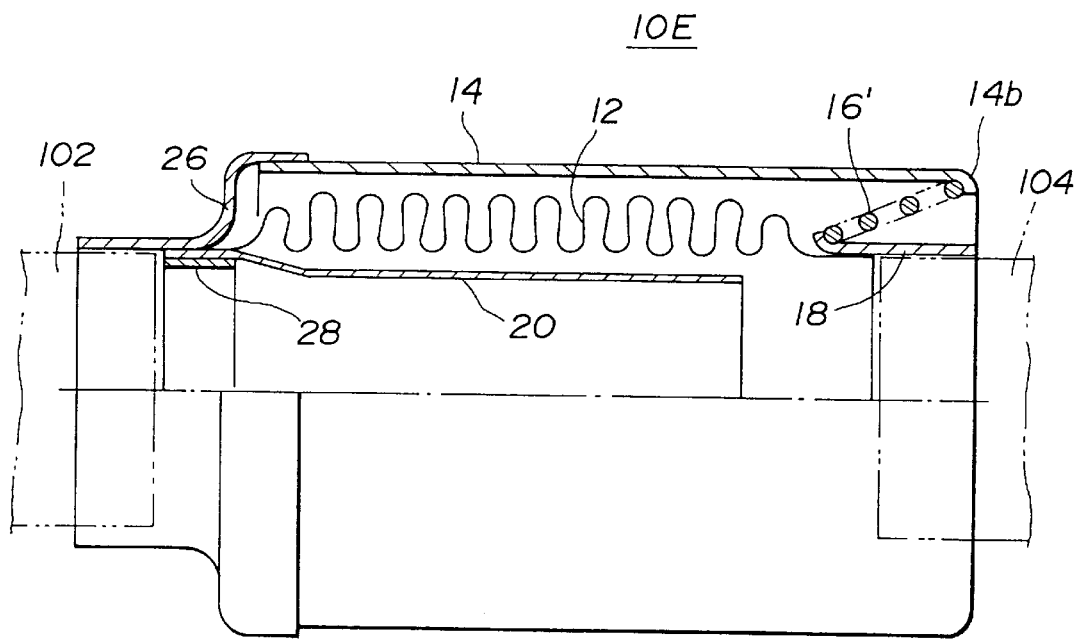
FIG. 7 is a view similar to FIG. 1, but showing a fifth embodiment of the present invention.

Referring to FIG. 7, there is shown a flexible pipe unit 10E which is a fifth embodiment of the present invention.

As shown in the drawing, in the unit 10E of this fifth embodiment, only one spring 16'0 is used. That is, the unit 10E comprises a metal bellows 12 which has axially opposed ends respectively connected to the front and rear pipes 102 and 104. The bellows 12 is coaxially received in a cylindrical outer case 14. A front open end of the outer case 14 has an annular front cover 26 welded thereto. The annular front cover 26 is welded to front pipe 102. A longer inner pipe 20 extends rear from the front cover 26 to a position near the inlet portion of the rear pipe 104.

As shown, an annular spring holder 18 is disposed on and welded to the inlet portion of the rear pipe 104. A conical spring 16' is compressed between a raised annular flange part of the spring holder 18 and an inwardly projected end 14b of the outer case 14.

When, in use, the exhaust pipe line is subjected to a certain dimensional change inducing a certain relative displacement between the front and rear pipes 102 and 104, the bellows 12 is forced to expand or contract to absorb or compensate the dimensional change. Due to usage of the spring 16' arranged in the abovementioned manner, the expansion and contraction of the bellows 12 has substantially no effect on the cylindrical outer case 14.

Figure 8:
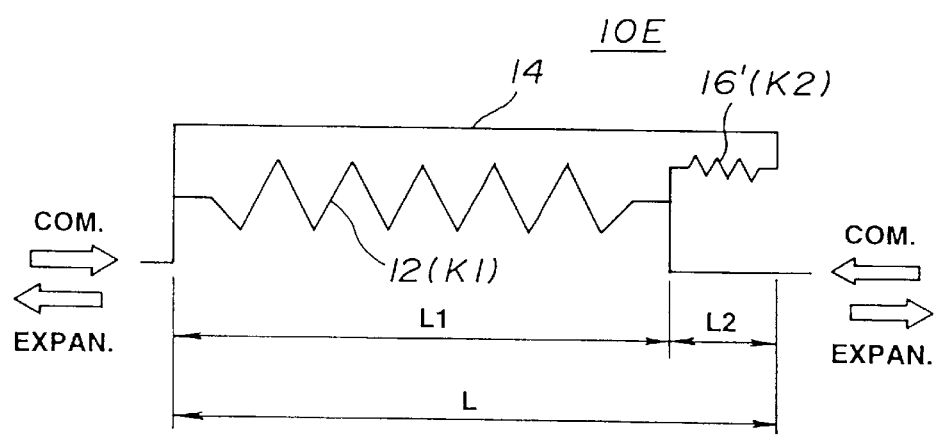
FIG. 8 is a schematic diagram showing the dimensional change compensating performance possessed by the flexible pipe unit of the fifth embodiment.

A spring constant "K" of the flexible pipe unit 10E is represented by the following equation (2). This equation (2) is easily derived when the unit 10E is schematically illustrated like the manner as shown by FIG. 8.

$$K=K1+K2 \qquad (2)$$

wherein:

K1: spring constant of bellows 12

K2: spring constant of conical spring 16'

From the equation (2), it is apparent that the spring constant "K" of the unit 10E becomes known when the spring constant "K1" of the bellows 12 and the spring constant "K2" of the conical spring 16' are known. Thus, even when the bellows 12 is constructed to have a smaller or larger spring constant, the unit 10A can have a desired spring constant by selecting a certain conical spring 16'.

When, under running of an associated motor vehicle, a dimensional change occurs in the exhaust pipe line in a direction to reduce the distance between the front and rear pipes 102 and 104, the bellows 12 is compressed and the conical spring 16' is expanded. While, when the dimensional change occurs in the other direction to increase the distance between the front and rear pipes 102 and 104, the bellows 12 is expanded and the conical spring 16' is compressed.

Thus, when the vehicle is running, the exhaust pipe line is subjected to vibration inducing a repeated dimensional change in distance between the front and rear pipes 102 and 104, the abovementioned expansion and contraction are alternatively and repeatedly carried out in the unit 10E thereby compensating for the dimensional change smoothly.

Due to usage of the spring 16', any stress and load applied to the bellows 12 from the rear pipe 104 can be smoothly and effectively reduced. Due to usage of the outer case 14, the bellows 12 and the conical spring 16' are protected from foreign objects such as bumped stones and the like during running of the vehicle. Due to usage of the inner pipe 20 in the bellows 12, a limited space defined therebetween can serve as a resonant box, and thus a certain noise reduction for the exhaust gas is achieved by the unit 10E. Due to the same reason, the heat of the exhaust gas is not directly transmitted to the bellows 12.

Figure 9:
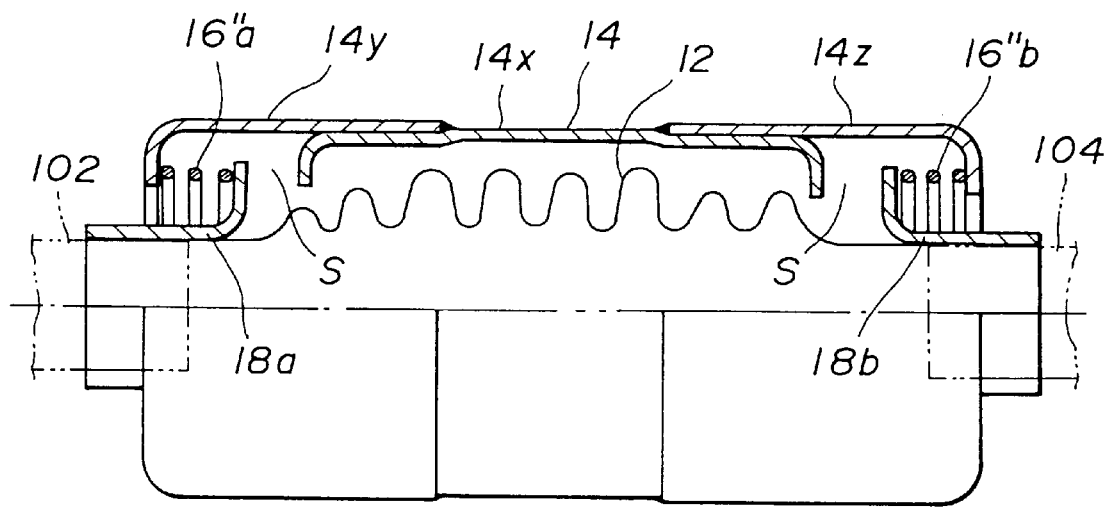
FIG. 9 is a view similar to FIG. 1, but showing a sixth embodiment of the present invention.

Referring to FIG. 9, there is shown a flexible pipe unit 10F which is a sixth embodiment of the present invention.

As shown in the drawing, in the unit 10F of this sixth embodiment, two identical springs 16"a and 16"b are used. That is, the unit 10F comprises a bellows 12 which has axially opposed ends respectively welded to the front and rear pipes 102 and 104. Disposed on and welded to the front and rear pipes 102 and 104 are annular spring holders 18a and 18b. The spring holders 18a and 18b and the bellows 12 are coaxially received in a cylindrical outer case 14. The outer case 14 comprises a center cylindrical part 14x and two outside cylindrical parts 14y and 14z which are welded to constitute a united outer case 14. As shown, the center cylindrical part 14x has axially opposed end portions (no numerals) projected radially inward. The outside cylindrical parts 14y and 14z have each an inwardly projected end (no numeral). Each of the identical coil springs 16"a and 16"b is compressed between a raised annular flange part of the spring holder 18a or 18b and the inwardly projected end of the outside cylindrical part 14y or 14z. Welding or caulking is used for securing the springs 16"a and 16"b to the outer case 14 and the spring holders 18a and 18b.

Figure 10:
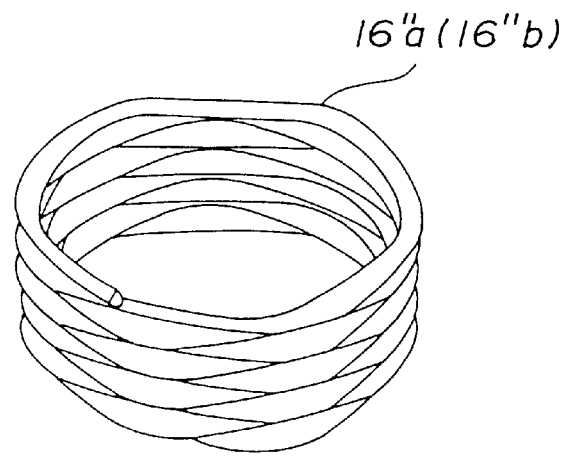
FIG. 10 is a perspective view of a coil spring used in the flexible pipe unit of the sixth embodiment.
Figure 11A:
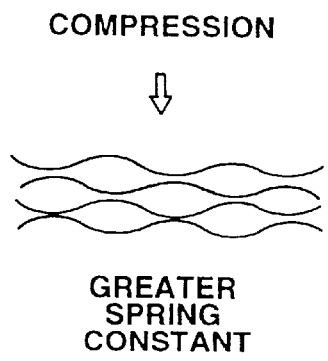
FIGS. 11A and 11B are enlarged views of a part of the coil spring of FIG. 10, showing different conditions of the spring.
Figure 11B:
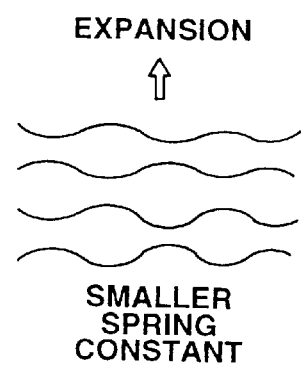

As is understood from FIG. 10, the coil spring 16"a or 16"b used in the sixth embodiment is a spring constructed by coiling a flat wire while twisting the same. The coil springs 16"a and 16"b thus have such a characteristic that a larger spring constant is obtained when compressed as shown in FIG. 11A and a smaller spring constant is obtained when expanded as shown in FIG. 11B.

Figure 12:
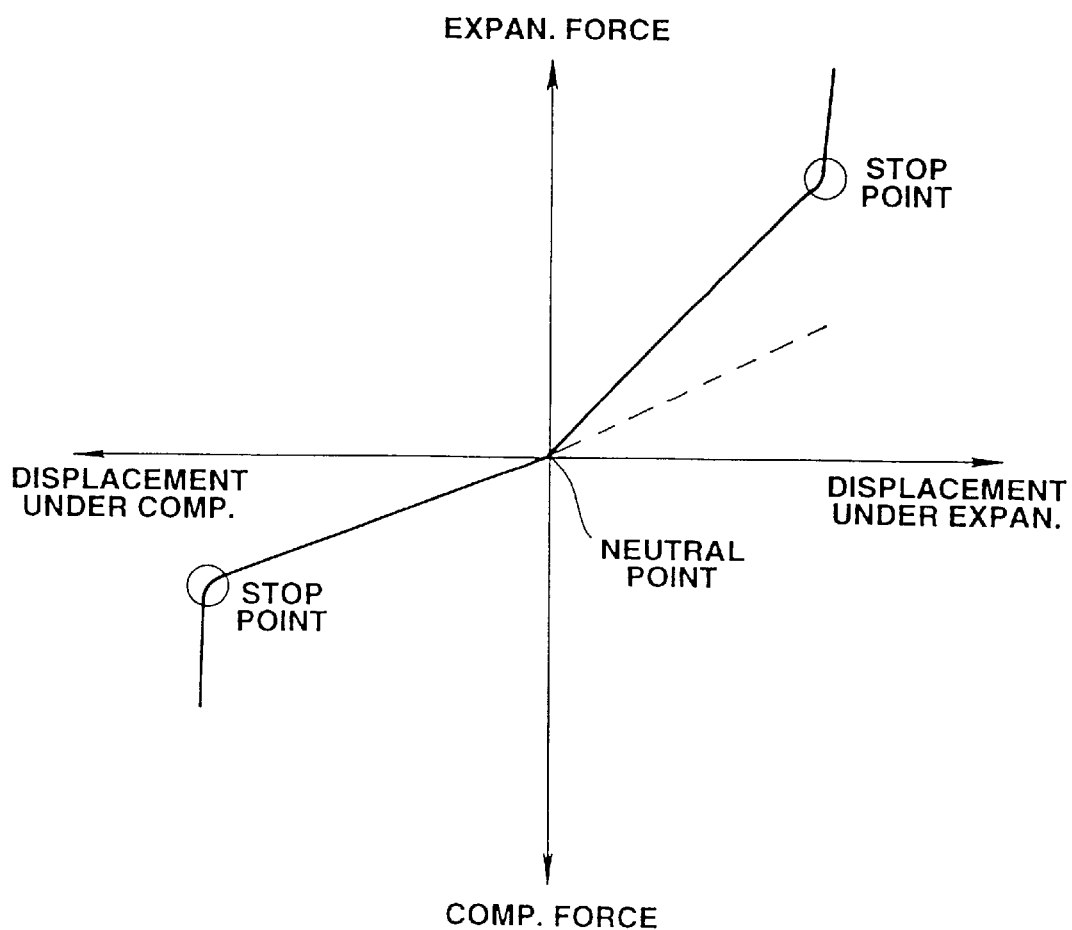
FIG. 12 is a graph showing the dimensional change compensating performance of the sixth embodiment.

As is seen from FIG. 9, under normal condition, there is defined a certain space "S" between the raised annular flange part of each spring holder 18a or 18b and the inwardly projected end of the center cylindrical part 14x. When the unit 10F is subjected to an axial expansion, the springs 16"a and 16"b are compressed, and when the unit 10F is subjected to an axial compression, the springs are expanded. Thus, the unit 10F has a dimensional change compensating performance as shown in the graph of FIG. 12. As is understood from this graph, the unit 10F has a larger spring constant when axially expanded, and a smaller spring constant when axially compressed.

Due to usage of the springs 16'a and 16'b, any stress and load applied to the bellows 12 from the front and rear pipes 102 and 104 can be smoothly and effectively damped. When the bellows 12 is compressed excessively, the inwardly projected ends of the center cylindrical part 14x of the outer case 14 can serve as stopper means. That is, in such case, the raised annular flange parts of the spring holders 18a and 18b care brought into contact with the inwardly projected ends thereby suppressing excessive compression of the bellows 12. When the bellows 12 is expanded excessively, the springs 16"a and 16"b can serve as stopper means. That is, in this case, the springs 16"a and 16"b are fully compressed to constitute a fixed structure serving as stopper means for the bellows 12.

Figure 13:
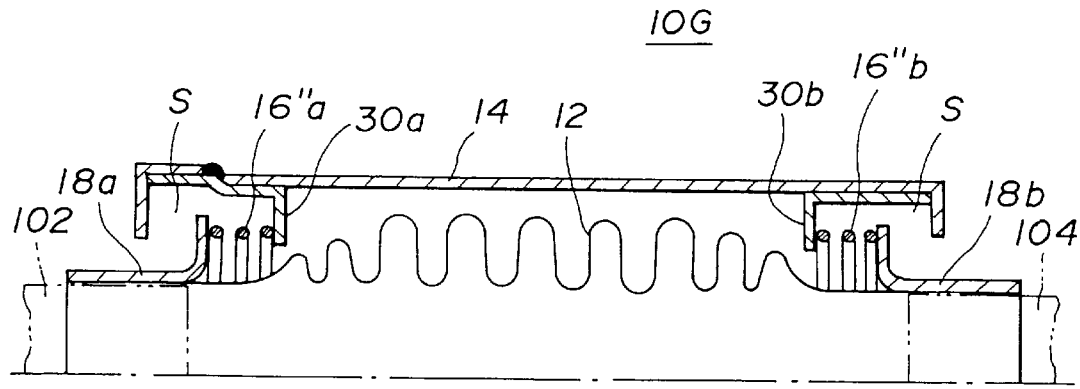
FIG. 13 is a view similar to FIG. 1, but showing a seventh embodiment of the present invention.

Referring to FIG. 13, there is shown a flexible pipe unit 10G which is a seventh embodiment of the present invention.

Similar to the unit 10F of the sixth embodiment, in the unit 10G of this seventh embodiment, two identical springs 16"a and 16"b are used. However, as will become apparent hereinafter, the connecting manner of the springs 16"a and 16"b to the unit 10G is different from that of the sixth embodiment 10F.

The unit 10G comprises a bellows 12 which has axially opposed ends respectively welded to the front and rear pipes 102 and 104. Disposed on and welded to the front and rear pipes 102 and 104 are annular spring holders 18a and 18b. The spring holders 18a and 18b and the bellows 12 are coaxially received in a cylindrical outer case 14. The outer case 14 has axially opposed ends (no numerals) which are radially inwardly projected. Annular spring holders 30a and 30b are secured to the opposed end portions of the outer case 14, which project inward. As shown, the spring holders 30a and 30b are positioned in a zone defined by the spring holders 18a and 18b. The coil spring 16"a is compressed between the spring holders 18a and 30a, and the other coil spring 16"b is compressed between the spring holders 18b and 30b.

Figure 14:
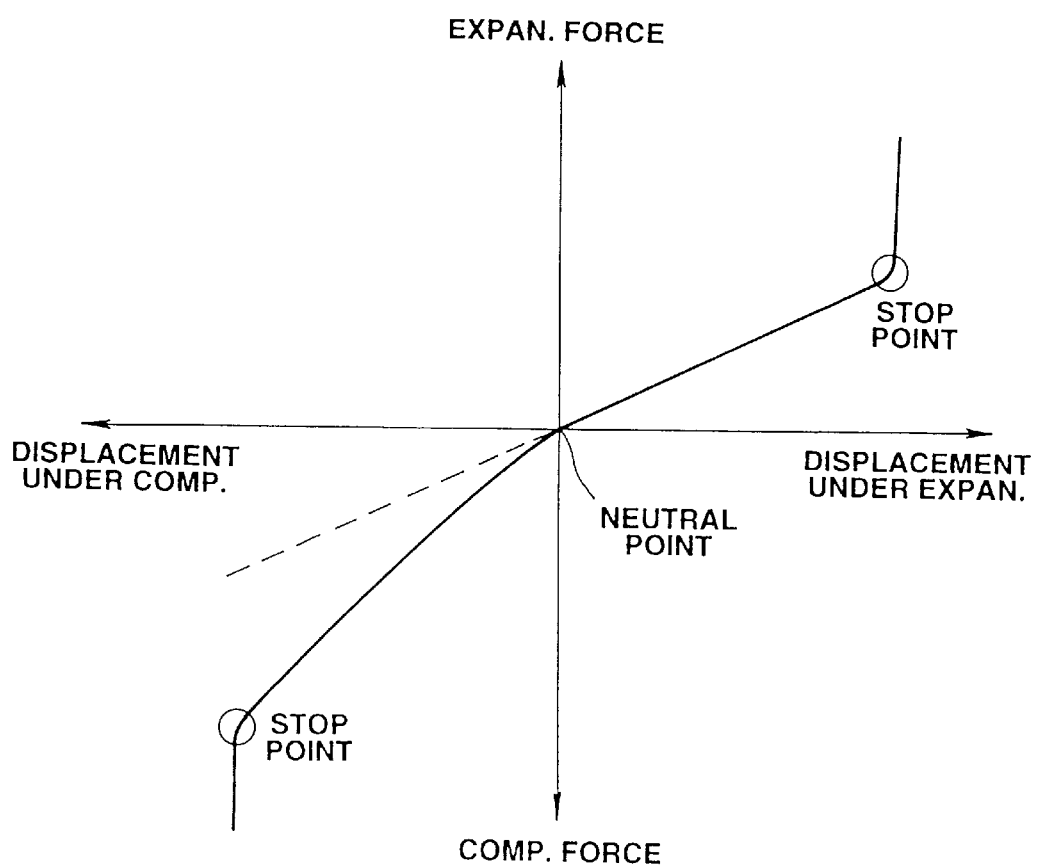
FIG. 14 is a graph showing the dimensional change compensating performance of the seventh embodiment.

As is seen from FIG. 13, under normal conditions, there is defined a certain space "S" between the raised annular flange part of each spring holder 18a or 18b and the inwardly projected end of the outer case 14. When the unit 10G is subjected to an axial expansion, the springs 16"a and 16"b are expanded, and when the unit 10G is subjected to an axial compression, the springs are compressed. Thus, the unit 10G has a dimensional change compensating performance as shown in the graph of FIG. 14. As is understood from this graph, the unit 10G has a larger spring constant when axially compressed, and a smaller spring constant when axially expanded.

Due to usage of the springs 16"a and 16"b, any stress and load applied to the bellows 12 from the front and rear pipes 102 and 104 can be smoothly and effectively damped. When the bellows 12 is compressed excessively, the springs 16"a and 16"b can serve as stopper means. That is, in this case, the springs are fully compressed to constitute a fixed structure serving as stopper means for the bellows 12 thereby suppressing excessive compression of the bellows 12. When the bellows 12 is expanded excessively, the raised annular flange parts of the spring holders 18a and 18b are brought into contact with the inwardly projected ends of the outer case 14 thereby suppressing excessive expansion of the bellows 12.

Figure 15:
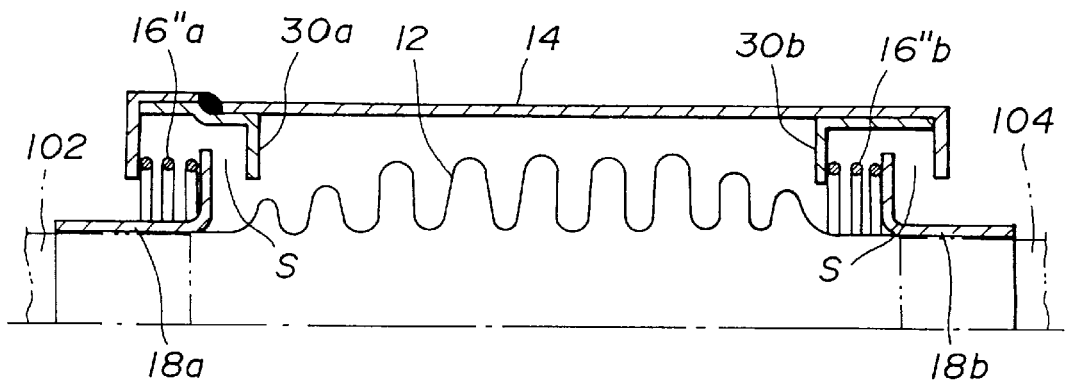
FIG. 15 is a view similar to FIG. 1, but showing an eighth embodiment of the present invention.

Referring to FIG. 15, there is shown a flexible pipe unit 10H which is an eighth embodiment of the present invention.

The unit 10H comprises a bellows 12 which has axially opposed ends respectively welded to the front and rear pipes 102 and 104. Disposed on and welded to the front and rear pipes 102 and 104 are annular spring holders 18a and 18b. The spring holders 18a and 18b and the bellows 12 are coaxially received in a cylindrical outer case 14. The outer case 14 has axially opposed ends (no numerals) which are radially inwardly projected. Annular brackets 30a and 30b are secured to the axially opposed end portions of the outer case 14, which project radially inward. The brackets 30a and 30b are positioned in a zone defined by the spring holders 18a and 18b.

It is to be noted that in this eighth embodiment, the coil spring 16"a is compressed between the spring holder 18a and the front inwardly projected end of the outer case 14, and the other coil spring 16"b is compressed between the spring holder 18b and the rear bracket 30b.

As is seen from FIG. 15, under normal condition, there are defined a certain space "S" between the front spring holder 18a and the front bracket 30a, and a space "S" between the rear spring holder 18b and the rear inwardly projected end of the outer case 14.

Figure 16:
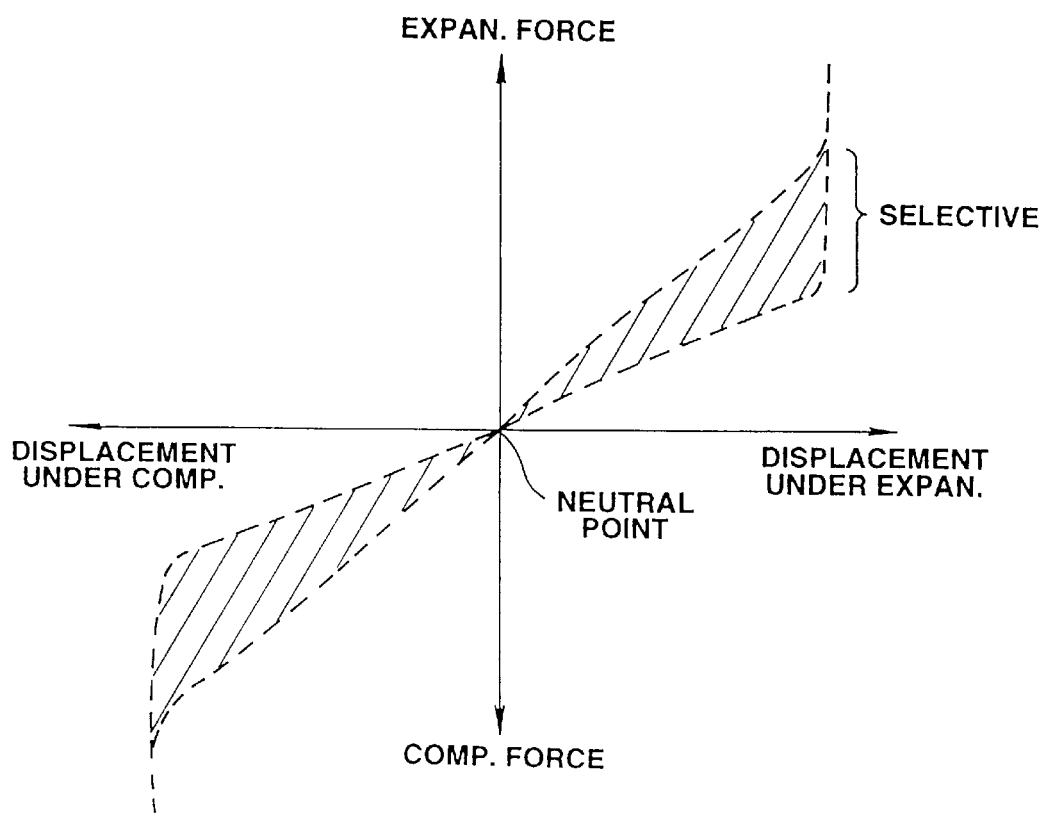
FIG. 16 is a graph showing the dimensional change compensating performance of the eighth embodiment.

When the unit 10H is subjected to an axial expansion, the coil spring 16"a is compressed and the other spring 16"b is expanded, and when the unit 10H is subjected to an axial compression, the coil spring 16"a is expanded and the other spring 16"b is compressed. Thus, the unit 10H has a dimensional change compensating performance as shown in the graph of FIG. 16. By selecting suitable springs for the springs 16"a and 16"b, the compensating performance of the unit 10H can be varied in a range hatched in the graph.

Figure 17:
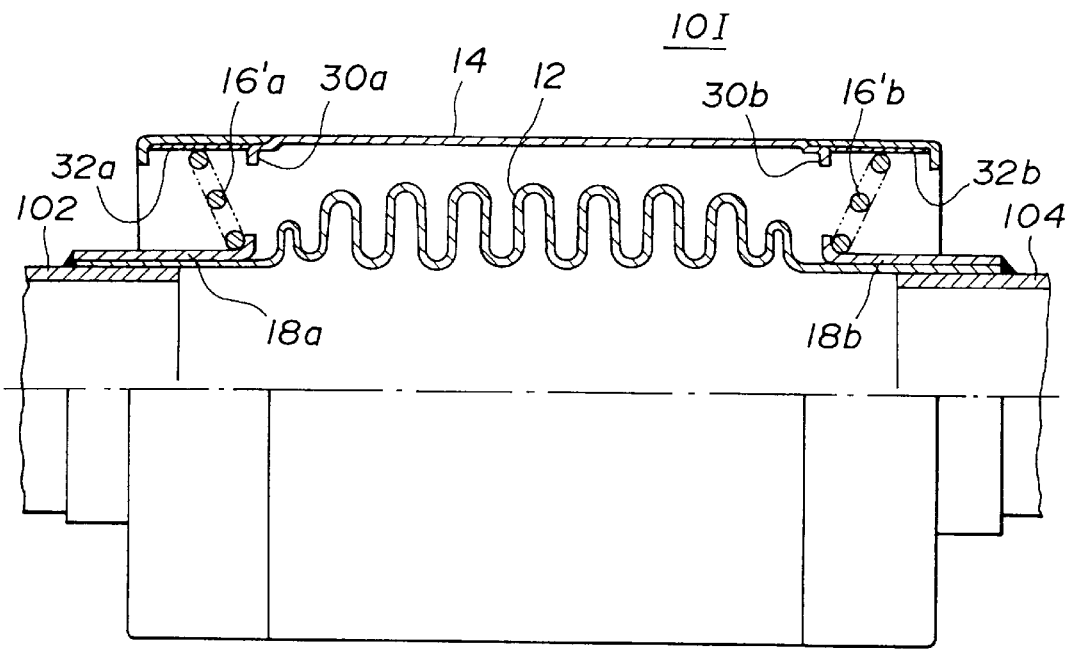
FIG. 17 is a view similar to FIG. 1, but showing a ninth embodiment of the present invention.

Referring to FIG. 17, there is shown a flexible pipe unit 10I which is a ninth embodiment of the present invention.

The unit 10I comprises a bellows 12 which has axially opposed ends respectively welded to the front and rear pipes 102 and 104. Disposed on and welded to the front and rear pipes 102 and 104 are annular spring holders 18a and 18b. The spring holders 18a and 18b and the bellows 12 are coaxially received in a cylindrical outer case 14. The outer case 14 has axially opposed ends (no numerals) which are radially inwardly projected. Annular brackets 30a and 30b are secured to the axially opposed end portions of the outer case 14, which project radially inward. As shown, under normal conditions of the unit 10I, each bracket 30a or 30b is positioned in agreement with the raised annular flange parts of the spring holder 18a or 18b.

As shown in the drawing, in this ninth embodiment 10I, conical springs 16'a and 16'b are used, one 16'a of which is arranged between the front spring holder 18a and the front inwardly projected end of the outer case 14, and the other 16'b of which is arranged between the rear spring holder 18b and the rear inwardly projected end of the outer case 14. More specifically, a diametrically smaller end of the conical spring 16'a or 16'b is engaged with and welded to the raised annular flange part of the spring holder 18a or 18b, and a diametrically larger end of the conical spring 16'a or 16'b is slidably engaged with an inner wall of the axially end portion of the outer case 14. A lubricant member 32a or 32b is applied to the inner wall of the outer case 14 for achieving a smoothed movement of the diametrically larger end of the conical spring 16'a or 16'b on the inner wall.

It is to be noted that under normal conditions, the diametrically larger end of the conical spring 16'a or 16'b is kept away from both the inwardly projected end of the outer case 14 and the bracket 30a or 30b, as shown.

When the unit 10I (more specifically, the bellows 12) is subjected to an axial expansion due to separating movement of the front and rear pipes 102 and 104, the diametrically larger ends of the conical springs 16'a and 16'b slide on the inner surface of the outer case 14 toward the corresponding inwardly projected ends of the same. Thus, under this condition, the unit 10I has a spring constant determined by only the bellows 12. When the axial expansion is continued, the diametrically larger ends of the conical springs 16'a and 16'b are brought into contact with the inwardly projected ends of the outer case 14. Under this condition, the unit 10I has a spring constant determined by the bellows 12 and the two conical springs 16'a and 16'b.

Figure 18:
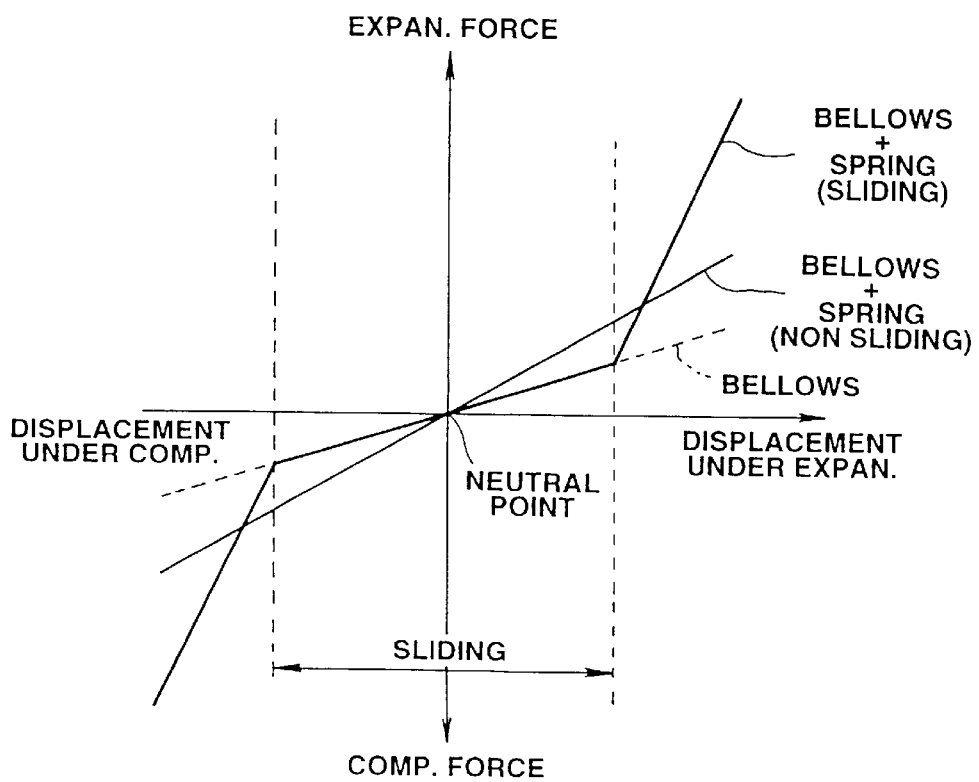
FIG. 18 is a graph showing the dimensional change compensating performance of the ninth embodiment.

When the unit 10I (more specifically, the bellows 12) is subjected to an axial compression due to the approaching movement of the front and rear pipes 102 and 104, the diametrically larger ends of the conical springs 16'a and 16'b slide on the inner surface of the outer case 14 toward the corresponding brackets 30a and 30b. Thus, under this condition, the unit 10I has a spring constant determined by only the bellows 12. When the axial compression is continued, the diametrically larger ends of the conical springs 16'a and 16'b are brought into contact with the brackets 30a and 30b. Under this condition, the unit 10I has a spring constant determined by the bellows 12 and the two conical springs 16'a and 16'b. Thus, the unit 10I has a dimensional change compensating performance as shown in the graph of FIG. 18.

Figure 19:
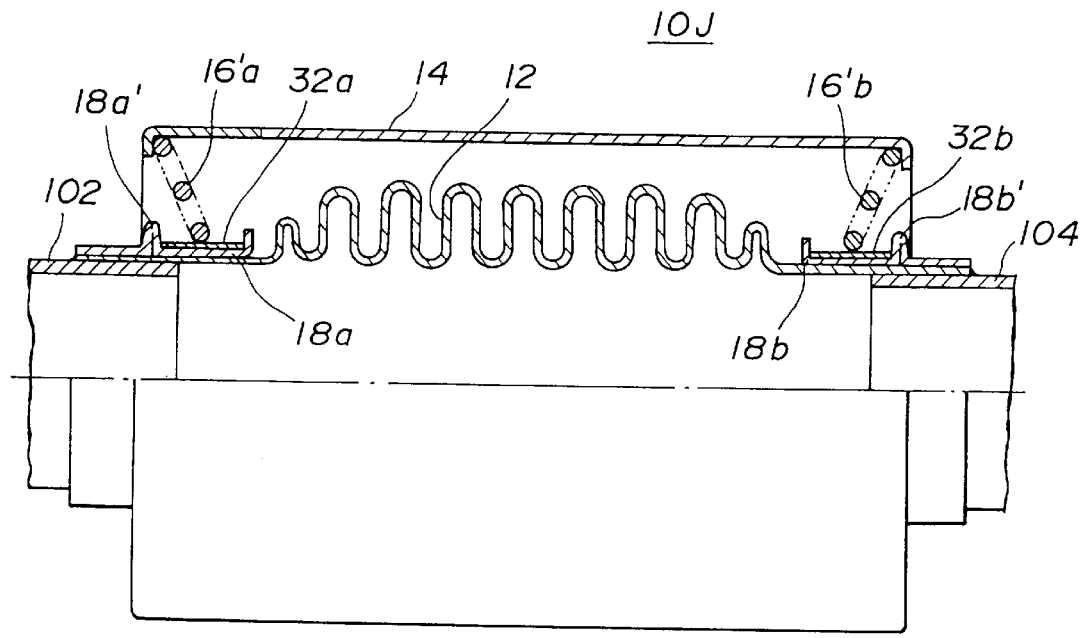
FIG. 19 is a view similar to FIG. 1, but showing a tenth embodiment of the present invention.

Referring to FIG. 19, there is shown a flexible pipe unit 10J which is a tenth embodiment of the present invention.

Since the unit 10J of this embodiment is similar to the abovementioned unit 10I of the ninth embodiment, only parts and portions which are different from those of the unit 10I will be described in the following. Substantially same parts as those of the unit 10I are denoted by the same numerals.

In the unit 10J of this tenth embodiment, the diametrically larger ends of the conical springs 16'a and 16'b are welded to the inwardly projected ends of the outer case 14, and the diametrically smaller ends of the same are slidably engaged with the spring holders 18a and 18b. Each spring holder 18a or 18b has a lubricant member 32a or 32b applied thereto. Furthermore, each spring holder 18a or 18b is formed with a raised portion 18a' or 18b' at a position in agreement with the corresponding inwardly projected end of the outer case 14.

Under normal conditions, the diametrically smaller end of the conical spring 16'a or 16'b is kept away from both the raised annular flange part of the spring holder 18a or 18b and the raised portion 18a' or 18b', as shown.

Operation of the unit 10J is easily understood when referring to the operation of the above-mentioned unit 10I of the ninth embodiment.

Figure 20:
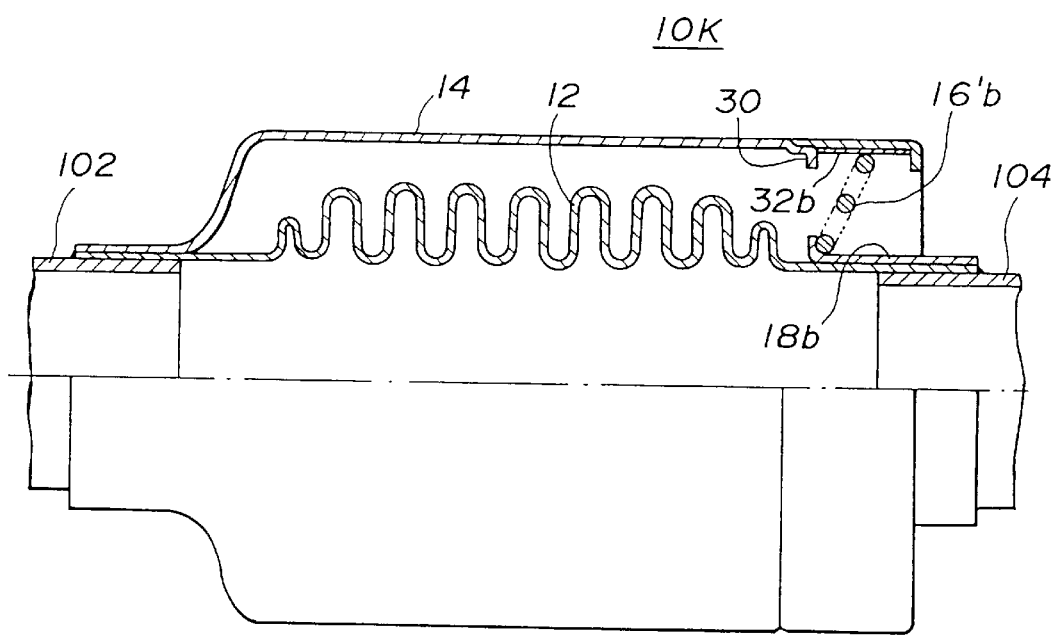
FIG. 20 is a view similar to FIG. 1, but showing an eleventh embodiment of the present invention.
Figure 21:
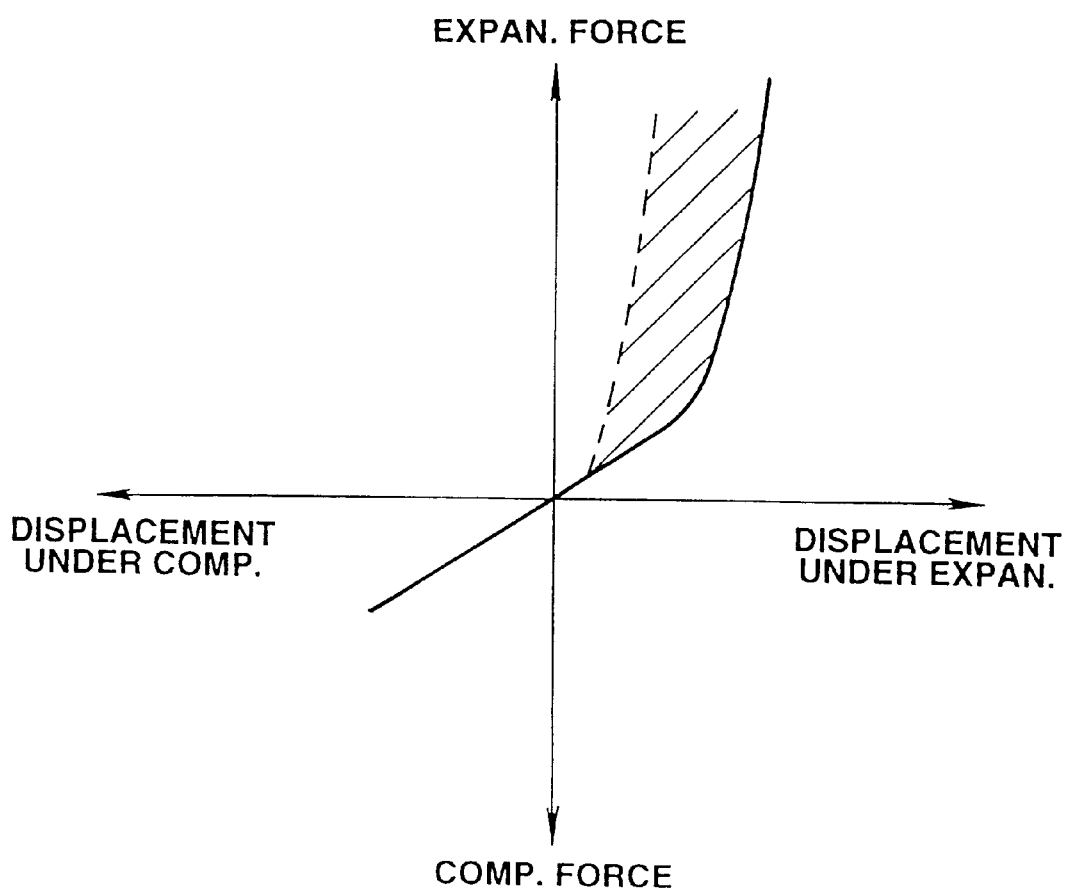
FIG. 21 is a graph showing the dimensional change compensating performance of the conventional flexible pipe unit of FIG. 34.

Referring to FIG. 20, there is shown a flexible pipe unit 10K which is an eleventh embodiment of the present invention.

The unit 10K of this embodiment is similar to the above-mentioned unit 10I of the ninth embodiment.

That is, in the eleventh embodiment 10K, only one conical spring 16'b is used. As shown, a rear structure including the spring holder 18b, the conical spring 16'b, the rear bracket 30b, the lubricant member 32b and the rear inwardly projected end of the outer case 14 is the same as that of the ninth embodiment 10I.

However, a front structure of the unit 10K is different from that of the ninth embodiment 10I. That is, in the eleventh embodiment 10K, the cylindrical outer case 14 is directly connected to the front pipe 102.

Operation of the unit 10K is easily understood when referring to the operation of the ninth embodiment 10I.

Figure 22A:
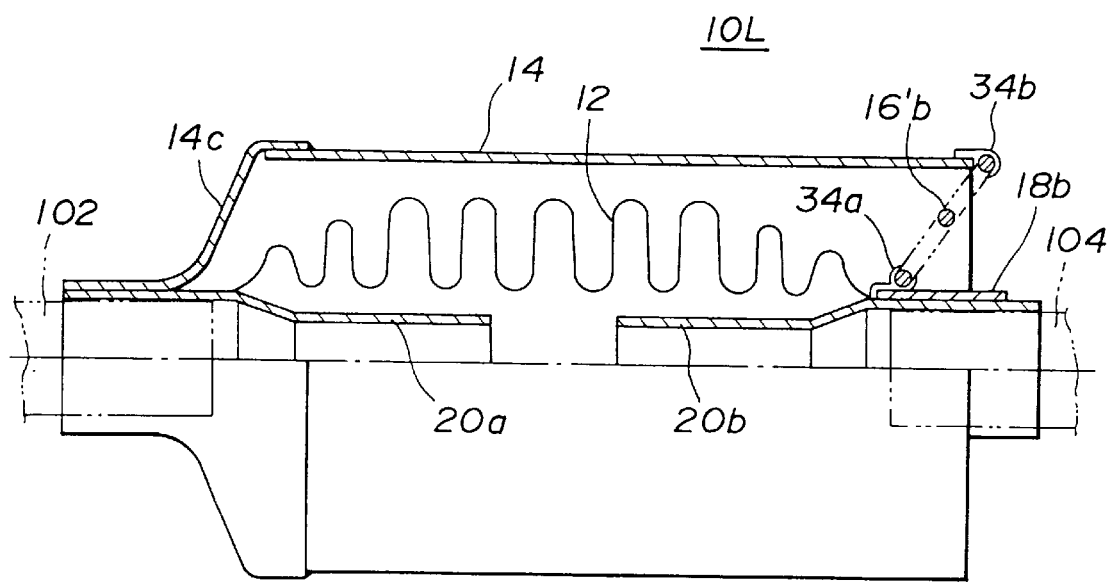
FIG. 22A is a view similar to FIG. 1, but showing a twelfth embodiment of the present invention.

Referring to FIG. 22A, there is shown a flexible pipe unit 10L which is a twelfth embodiment of the present invention.

Since the unit 10L of this embodiment is similar to the abovementioned second embodiment 10B of FIG. 4, only parts and portions which are different from those of the second embodiment 10B will be described in the following. Substantially same parts as those of the second embodiment 10B are denoted by the same numerals.

Figure 22B:
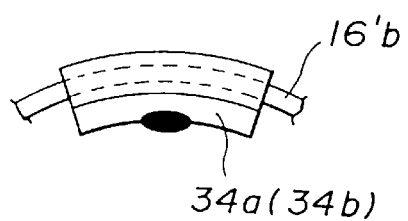
FIG. 22B is a view of a part of the twelfth embodiment, where a conical spring and associated parts thereof are arranged.

As shown in FIG. 22A, in the twelfth embodiment 10L, only one conical spring 16'b is used. The cylindrical outer case 14 has an annular front cover 14c secured to the front pipe 102. A diametrically smaller end of the conical spring 16'b is held by circularly arranged spring catchers 34a welded to the rear spring holder 18b, and a diametrically larger end of the same is held by circularly arranged spring catchers 34b welded to the rear end of the outer case 14. As is seen from FIG. 22B, each spring catcher 34a or 34b is of a sectoral piece with a curved channel into which the end element of the spring 16'b is neatly received.

Operation of the unit 10L is easily understood when referring to the operation of the second embodiment 10B.

Figure 23A:
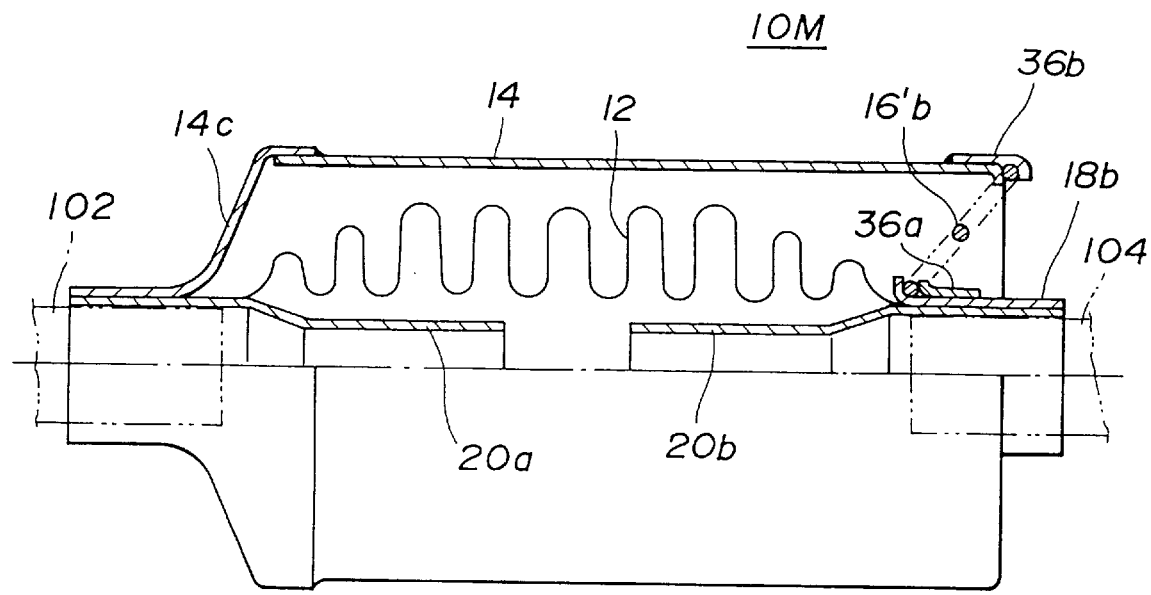
FIG. 23A is a view similar to FIG. 1, but showing a thirteenth embodiment of the present invention.

Referring to FIG. 23A, there is shown a flexible pipe unit 10M which is a thirteenth embodiment of the present invention.

Since the unit 10M of this embodiment is similar to the above-mentioned twelfth embodiment 10L, only parts and portions which are different from those of the twelfth embodiment 10L will be described in the following.

Figure 23B:
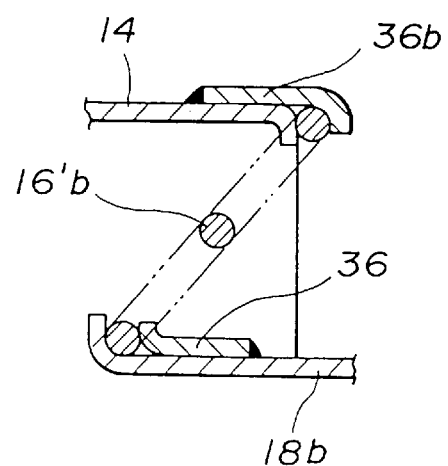
FIG. 23B is a view of a part of the thirteenth embodiment, where a conical spring and associated parts thereof are arranged.

As is shown in FIGS. 23A and 23B, particularly FIG. 23B, in the thirteenth embodiment 10M, an inner annular member 36a is welded to the rear spring holder 18b to catch the diametrically smaller end of the conical spring 16'b with aid of a raised annular flange part of the spring holder 18b, and an outer annular member 36b is welded to the rear end of the outer case 14 to catch the diametrically larger end of the conical spring 16'b with aid of the rear end of the outer case 14.

Figure 24A:
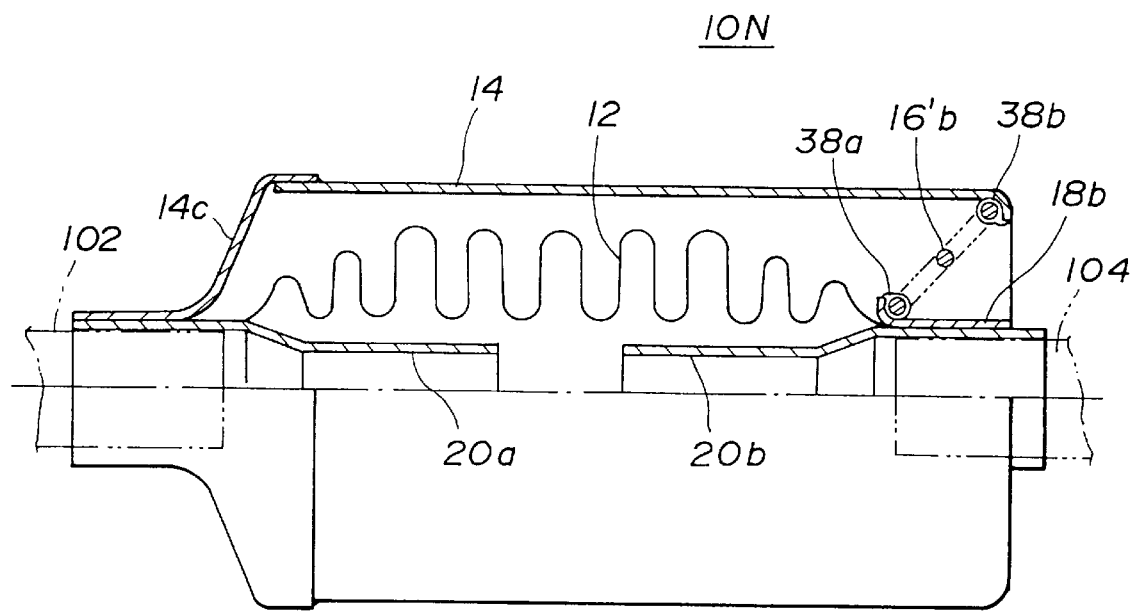
FIG. 24A is a view similar to FIG. 1, but showing a fourteenth embodiment of the present invention.

Referring to FIG. 24A, there is shown a flexible pipe unit 10N which is a fourteenth embodiment of the present invention.

Figure 24B:
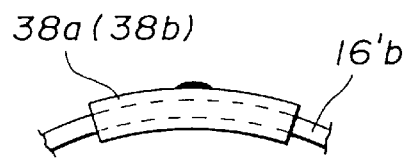
FIG. 24B is a view of a part of the fourteenth embodiment, where a conical spring and associated parts thereof are arranged.

In this embodiment, the diametrically smaller end of the conical spring 16'b is held by circularly arranged spring catchers 38a welded to a raised annular flange part of the rear spring holders 18b and the diametrically larger end of the same is held by circularly arranged spring catchers 38b welded to a rear inwardly projected end of the outer case 14. This arrangement will be easily understood when referring to FIG. 24B.

Figure 25A:
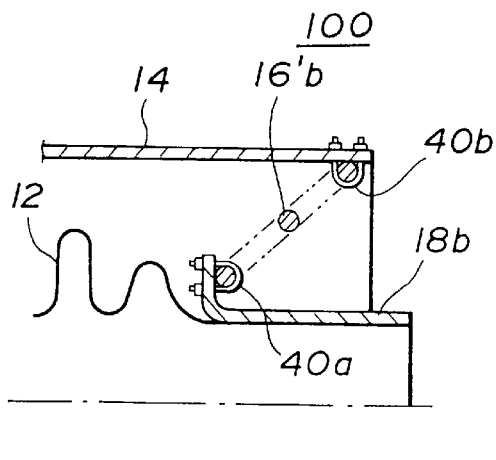
FIG. 25A is a sectional view of a part of a flexible pipe unit of a fifteenth embodiment of the present invention, where a conical spring and associated parts thereof are arranged.
Figure 25B:
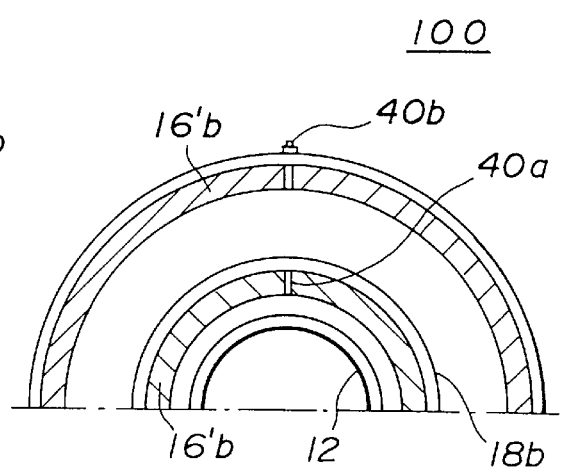
FIG. 25B is a view of the part of the unit of the fifteenth embodiment, which is taken from an axial direction.
Figures 1, 25C:
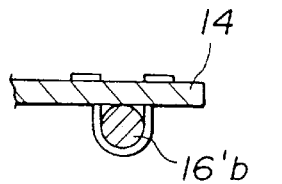
Figures 2, 25C:
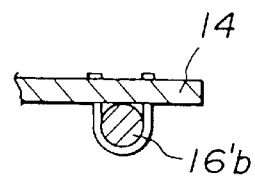
Figures 3, 25C:
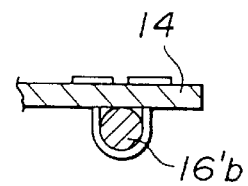
Figures 1, 25D:
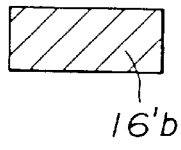
Figures 2, 25D:
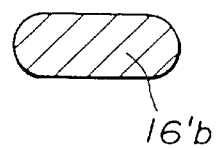
Figures 3, 25D:
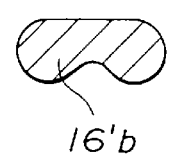

Referring to FIG. 25A, there is partially shown a flexible pipe unit 100 which is a fifteenth embodiment of the present invention.

In this embodiment, the diametrically smaller end of the conical spring 16'b is secured to the spring holder 18b by means of a bolted U-shaped catcher 40a, and the diametrically larger end of the same is secured to the rear end of the outer case 14 by means of another bolted U-shaped catcher 40b. Various types of U-shaped catchers are usable in this embodiment, some of which are shown in FIGS. 25C-1, 25C-2 and 25C-3. Furthermore, the catchers may have various cross sections some of which are shown in FIGS. 25D-1, 25D-2 and 25D-3.

Figure 26:
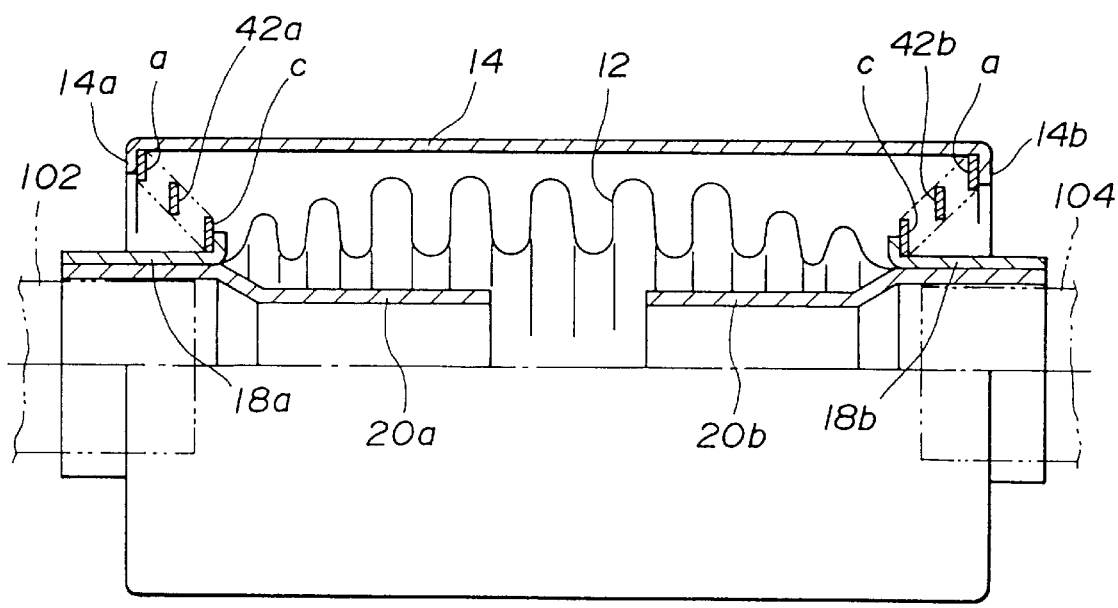
FIG. 26 is a view similar to FIG. 1, but showing a sixteenth embodiment of the present invention.

Referring to FIG. 26, there is shown a flexible pipe unit 10P which is a sixteenth embodiment of the present invention.

The unit 10P of this embodiment is substantially the same as the above-mentioned second embodiment 10B of FIG. 4 except the springs.

That is, as shown in FIG. 26, in the sixteenth embodiment 10P, two circular plate springs 42a and 42b are used in place of the two conical springs 16'a and 16'b of the second embodiment 10B.

Diametrically smaller and larger ends of each circular plate spring 42a or 42b are welded to the raised annular flange part of the corresponding spring holder 18a or 18b and the corresponding inwardly projected end of the outer case 14 respectively.

Figure 27A:
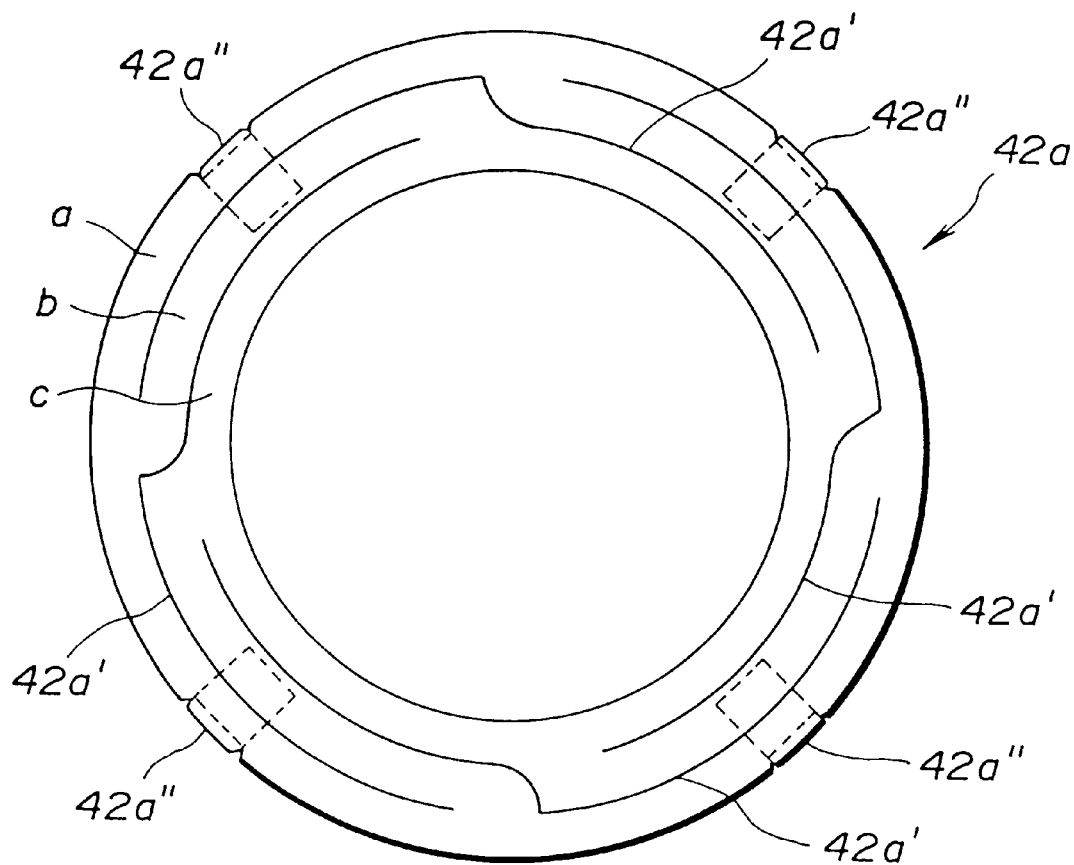
FIG. 27A is a plan view of a front plate spring used in the flexible pipe unit of the sixteenth embodiment.
Figure 27B:
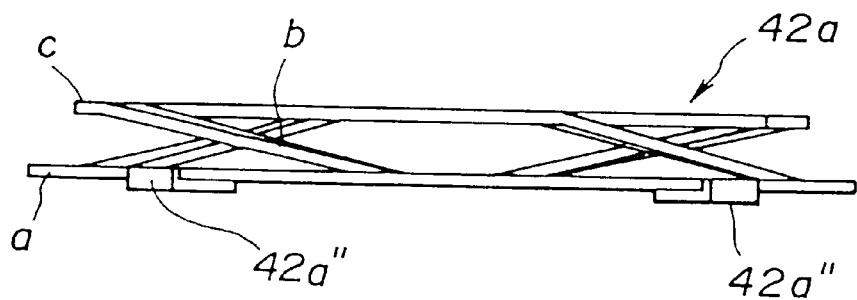
FIG. 27B is a side view of the front plate spring used in the sixteenth embodiment.
Figure 28A:
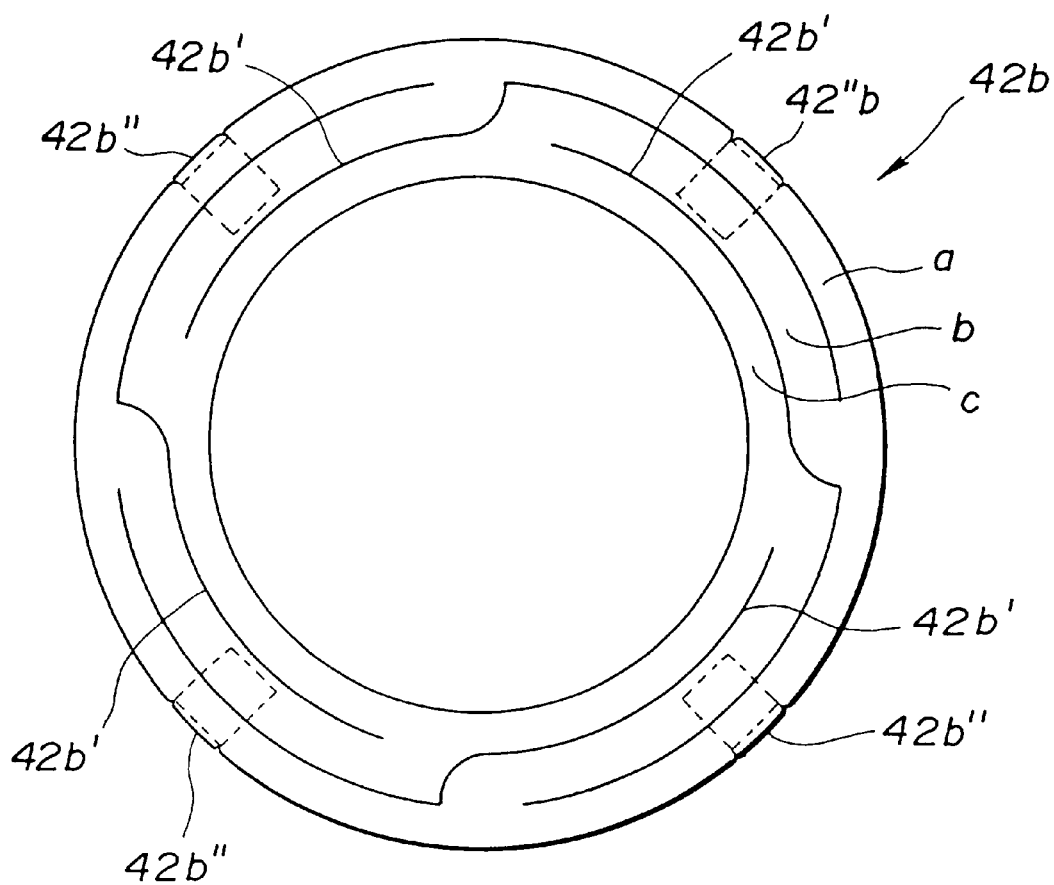
FIG. 28A is a view similar to FIG. 27A, but showing a rear plate spring used in the unit of the sixteenth embodiment.
Figure 28B:
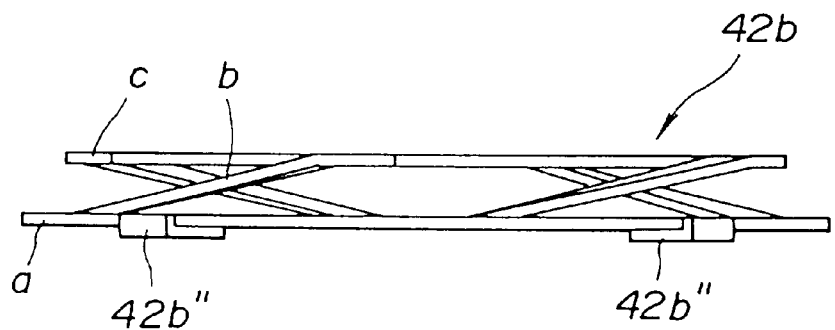
FIG. 28B is a view similar to FIG. 27B, but showing the rear plate spring.

The circular plate spring 42a is clearly shown in FIGS. 27A and 27B and the other circular plate spring 42b is clearly shown in FIGS. 28A and 28B. As is seen from these drawings, the two plate springs 42a and 42b are mirror image parts. The plate springs 42a are 42b are made of a steel plate. As is seen from these drawings, each plate spring 42a or 42b is produced by making round cuts 42a' or 42b' in a circular steel plate, each cut 42a' or 42b' including an outer part and an inner part which are united at a junction part. In the illustrated example, four round cuts 42a' or 42b' are provided in each steel plate. With these cuts, each plate spring 42a or 42b is shaped to have the diametrically larger end "a", the diametrically smaller end "c" and an intermediate part "b". Each spring 42a or 42b has four stopper pieces 42a" or 42b" possessed by the larger diameter end "a" thereof. When in use, the diametrically larger and smaller ends "a" and "c" of the spring 42a or 42b are pulled in opposite directions to cause the spring to have a certain thickness as shown in FIGS. 27B and 28B. That is, in practical use, the intermediate part "b" serves as an inclined support between the larger and smaller ends "a" and "c".

Operation of the unit 10P of the sixteenth embodiment is substantially the same as the second embodiment 10B of FIG. 4. Due to the nature of the plate springs 42a and 42b used, the unit 10P of the sixteenth embodiment can exhibit excellent dimensional change compensating performance against an external stress applied perpendicularly to the unit 10P.

Figure 29:
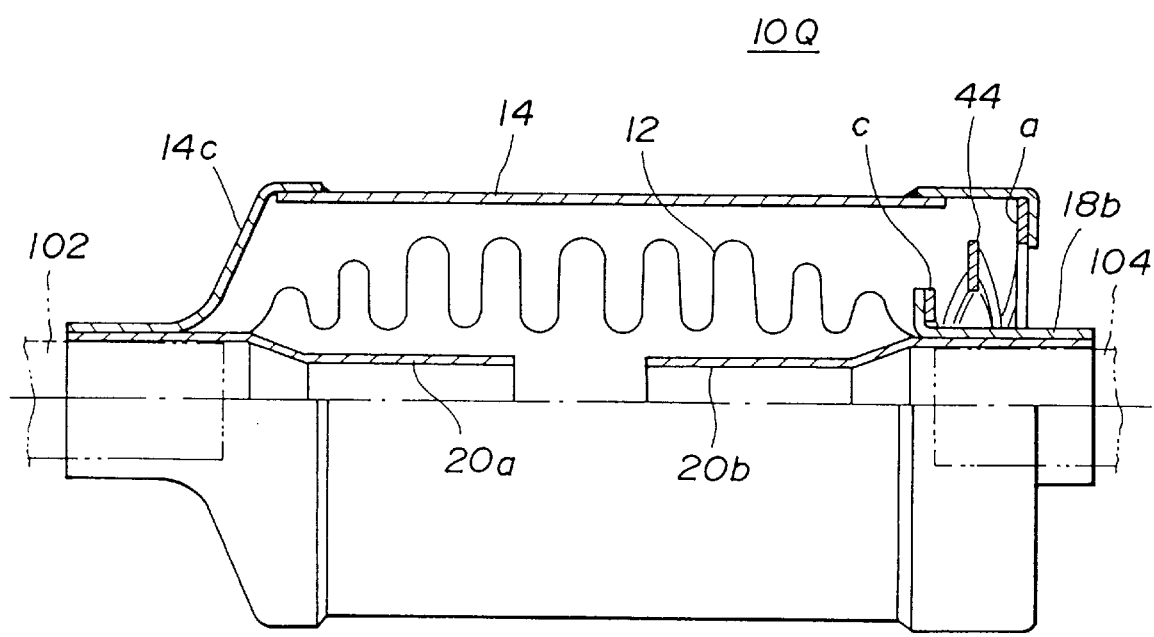
FIG. 29 is a view similar to FIG. 1, but showing a seventeenth embodiment of the present invention.

Referring to FIG. 29, there is shown a flexible pipe unit 10Q which is a seventeenth embodiment of the present invention.

The unit 10Q of this embodiment is substantially the same as the above-mentioned twelfth embodiment 10L of FIG. 22A except the spring.

As shown in FIG. 29, in the seventeenth embodiment 10Q, a circular plate spring 44 is used in place of the conical spring 16'b of the twelfth embodiment 10L.

Diametrically smaller and larger ends "c" and "a" of the circular plate spring 44 are welded to the raised annular flange part of the spring seat 18b and the rear inwardly projected end of the outer case 14. In the illustrated embodiment, the inwardly projected end is formed on a separate member welded to the outer case 14.

Figure 30A:
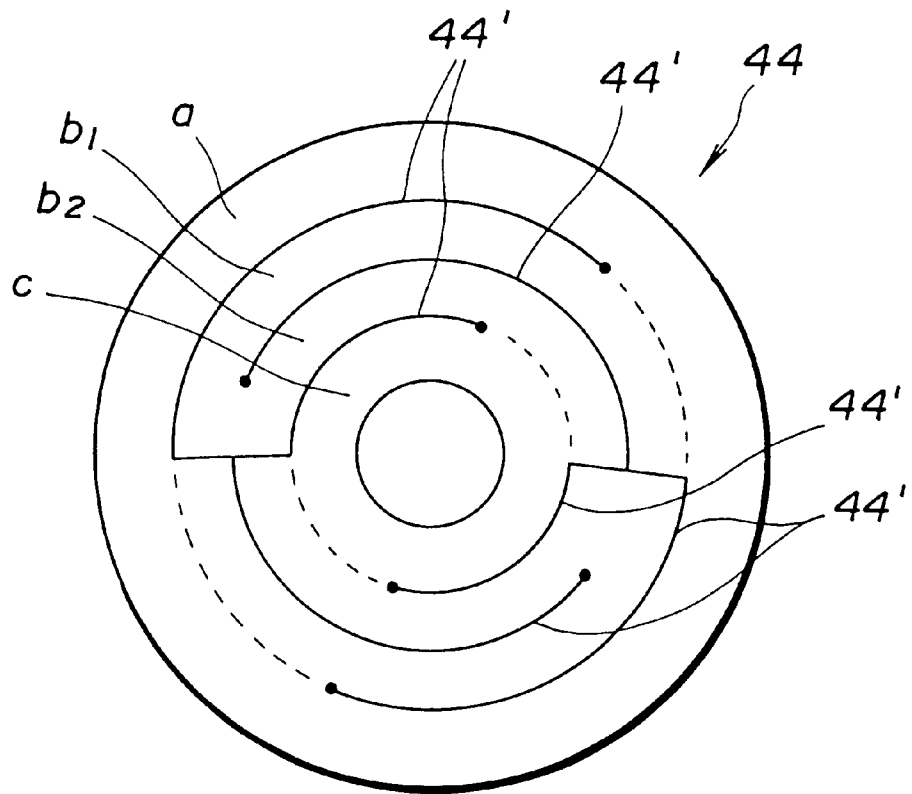
FIG. 30A is a plan view of a plate spring used in the flexible pipe unit of the seventeenth embodiment.
Figure 30B:
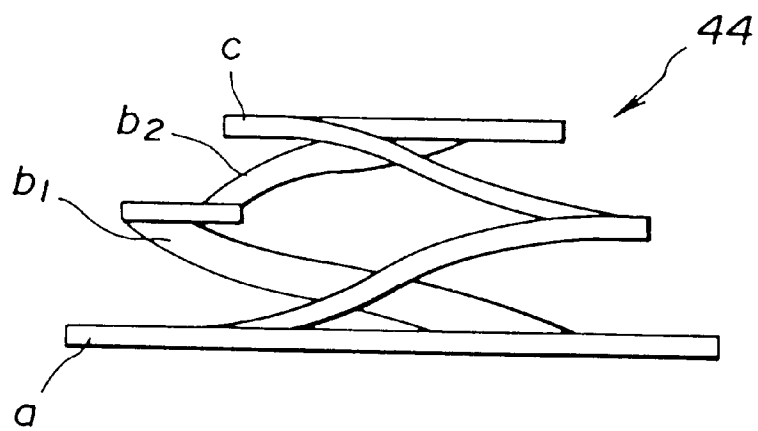
FIG. 30B is a side view of the plate spring used in the seventeenth embodiment.

The circular plate spring 44 is clearly shown in FIGS. 30A and 30B. The plate spring 44 is constructed of a steel plate. As is seen from these drawings, the plate spring 44 is produced by making round cuts 44' in a circular steel plate. Some of the cuts 44' are united through radial cuts in an illustrated manner. With these cuts 44', the plate spring 44 is shaped to have the diametrically larger end "a", the diametrically smaller end "c", and larger and smaller intermediate parts "b1" and "b2".

Operation of the unit 10Q of the seventeenth embodiment is substantially the same as that of the twelfth embodiment 10L. Due to the nature of the plate spring 44, the unit 10Q can exhibit excellent dimensional change compensating performance against an external stress applied perpendicularly to the unit 10Q.

Figure 31:
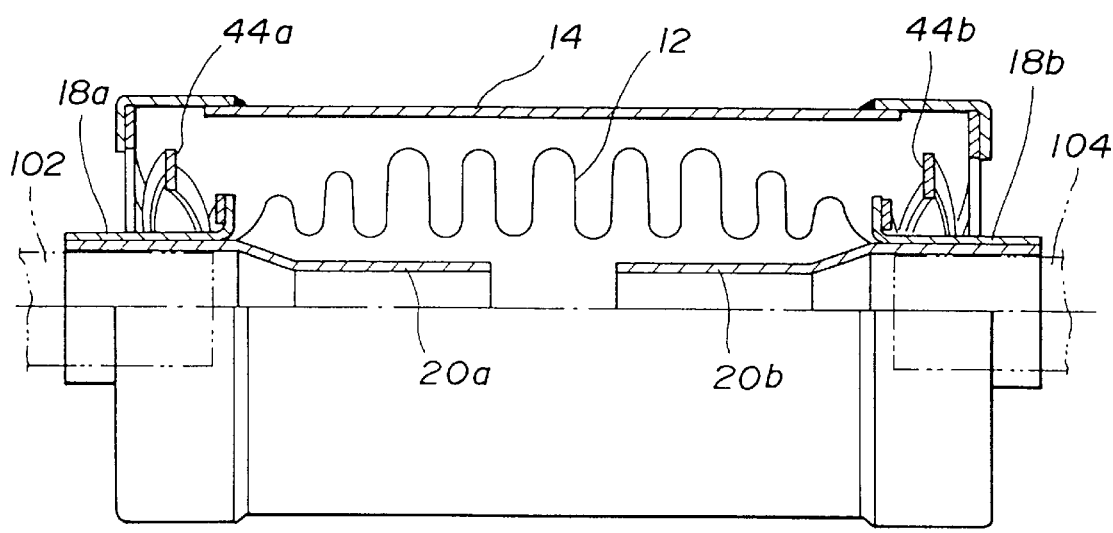
FIG. 31 is a view similar to FIG. 1, but showing an eighteenth embodiment of the present invention.

Referring to FIG. 31, there is shown a flexible pipe unit 10R which is an eighteenth embodiment of the present invention.

The unit 10R of this embodiment is substantially the same as the above-mentioned sixteenth embodiment 10P of FIG. 26 except the springs.

That is, as is seen from FIG. 31, in the eighteenth embodiment, two circular plate springs 44a and 44b identical to the above-mentioned plate spring 44 are used in place of the plate springs 42a and 42b of the sixteenth embodiment. Preferably, the springs 44a and 44b are mirror image parts. In the illustrated embodiment, the front and rear inwardly projected ends to which the diametrically larger ends of the plate springs 44a and 44b are engaged are possessed by separate members which are welded to the outer case 14.

Operation of the unit 10R of the eighteenth embodiment is substantially the same as that of the sixteenth embodiment.

Figure 32A:
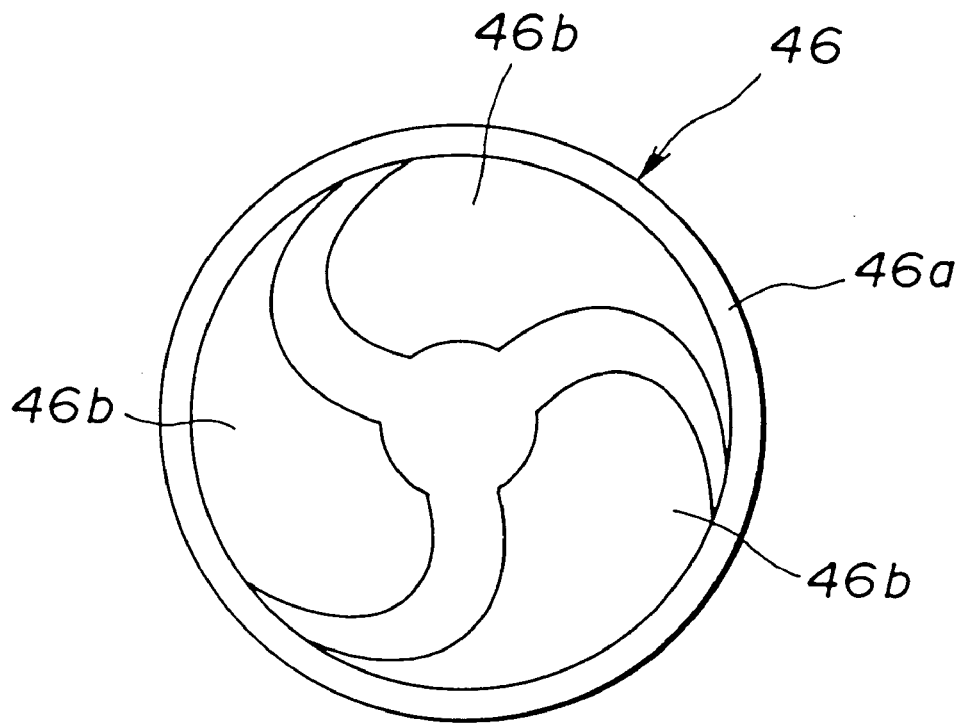
FIG. 32A is a plan view of a plate spring used in a first modification of the eighteenth embodiment.
Figure 32B:
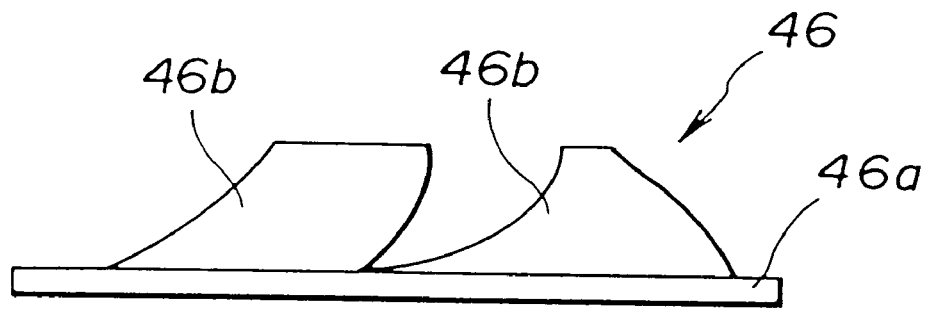
FIG. 32B is a side view of the plate spring used in the first modification of the eighteenth embodiment.
Figure 33A:
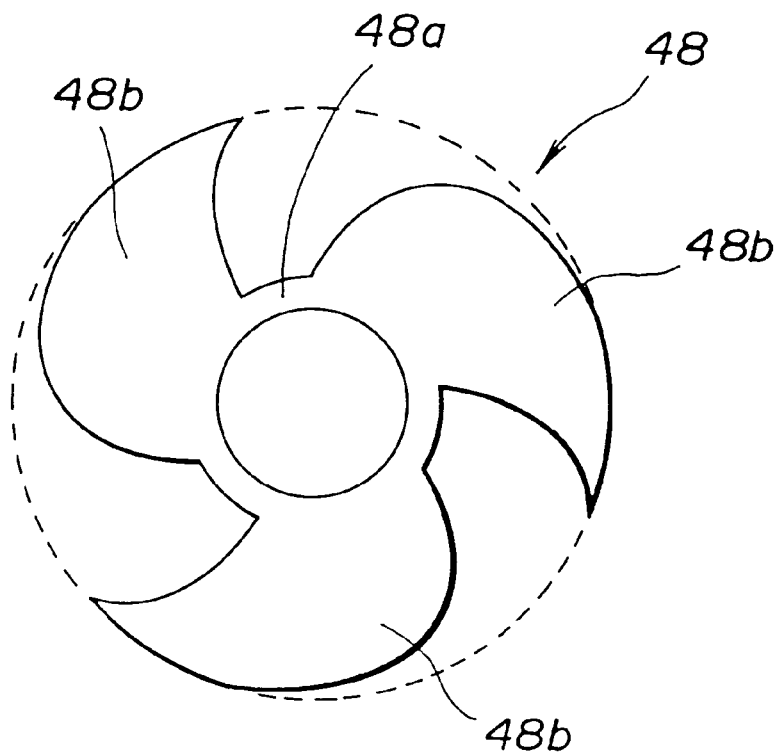
FIG. 33A is a view similar to FIG. 32A, but showing a plate spring used in a second modification of the eighteenth embodiment.
Figure 33B:
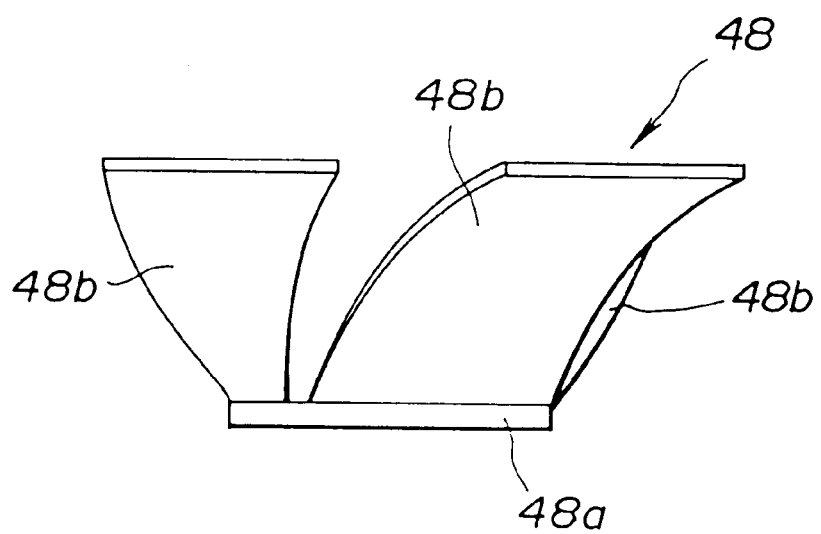
FIG. 33B is a view similar to FIG. 32B, but showing the plate spring used in the second modification of the eighteenth embodiment.
Figure 34:
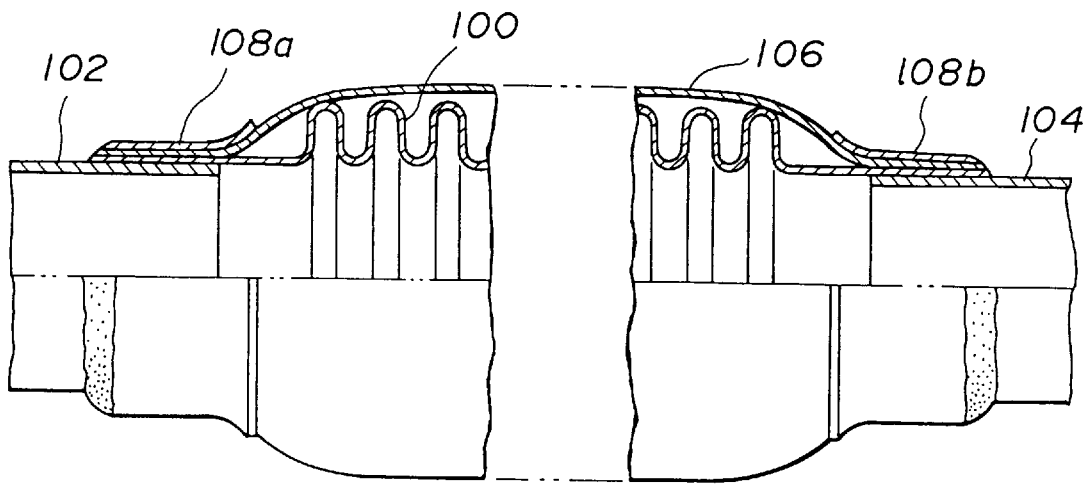
FIG. 34 is a sectional view of a conventional flexible pipe unit.
Figure 35:
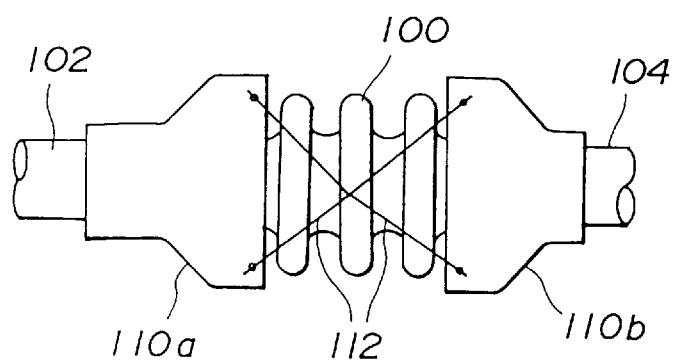
FIG. 35 is a sectional view of another conventional flexible pipe unit.
Figure 36:
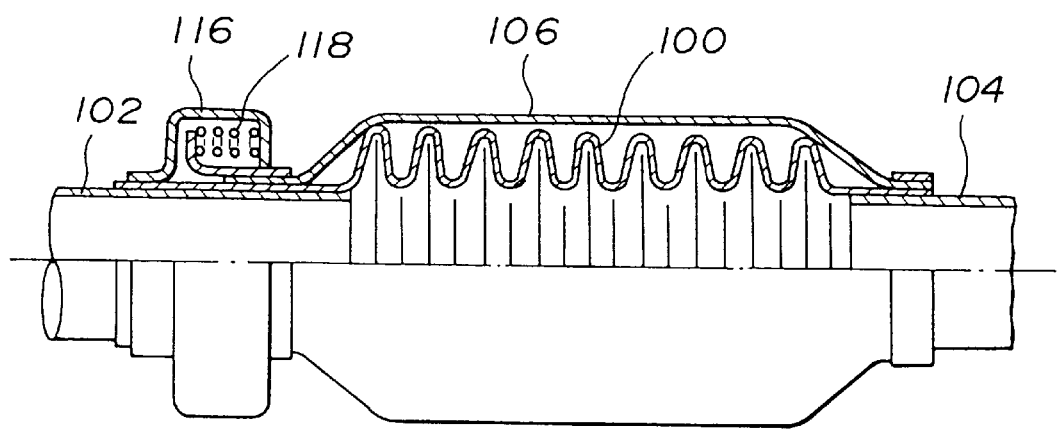
FIG. 36 is a sectional view of still another conventional flexible pipe unit.

If desired, in place of the above-mentioned plate springs 42a, 42b, 44, 44a and 44b, a plate spring 46 as shown in FIGS. 32A and 32B and a plate spring 48 as shown in FIGS. 33A and 33B may be used.

The plate spring 46 of FIGS. 32A and 32B comprises an annular base part 46a and three equally spaced blade parts 46b which are raised from the annular base pate 46a. As is seen from FIG. 32B, the raised blade parts 46b have mutually converging upper ends. The annular base part 46a serves as the diametrically larger end.

The plate spring 48 of FIGS. 33A and 33B comprises an annular base part 48a and three equally spaced blade parts 48b which are raised from the annular base part 48a. As is seen from FIG. 33B, the raised blade parts 48b have mutually receding upper ends. The annular base part 48a serves as the diametrically smaller end.

While the present invention has been disclosed in terms of embodiments in order to facilitate better understanding thereof, it should be appreciated that the invention can be embodied in various ways without departing the principle of the invention. Therefore, the invention should be understood to include all possible embodiments and modifications to the shown embodiments which can be embodied without departing from the principle of the invention as set forth in the appended claims.

What is claimed is:

1. A flexible pipe unit disposable between aligned first and second exhaust pipes of an internal combustion engine, comprising:
   a metal bellows having a front open end adapted to be connected to said first exhaust pipe and a rear open end adapted to be connected to said second exhaust pipe;
   a cylindrical outer metal case coaxially disposed about said metal bellows, with a cylindrical space defined between said outer case and said metal bellows;

a first structure arranged between a front end of said outer case and a front end of said bellows to achieve a mechanical connection therebetween; and a second structure arranged between a rear end of said outer case and a rear end of said bellows to achieve a mechanical connection therebetween, wherein at least one of said first and second structures includes a spring member resiliently connecting said bellows and said outer case.

2. A flexible pipe unit as claimed in claim 1, further comprising an inner pipe which coaxially extends in said metal bellows from the front open end of said metal bellows toward the rear open end of said bellows leaving a clearance between a leading end of said inner pipe and said rear open end thereby causing a chamber defined between said bellows and said inner pipe to serve as a resonance chamber.

3. A flexible pipe unit as claimed in claim 1, further comprising:

a front inner pipe coaxially extending in said metal bellows from the front open end of said metal bellows toward the rear open end of said bellows;

a rear inner pipe coaxially extending in said metal bellows from the rear open end of said metal bellows toward the front open end of said bellows, wherein leading ends of said front and rear inner pipes face each other to define a clearance therebetween thereby causing a chamber defined between said bellows and said front and rear inner pipes to serve as a resonance chamber.

4. A flexible pipe unit as claimed in claim 1, in which said cylindrical outer case is constructed of a plurality of cylindrical parts which are welded.

5. A flexible pipe unit as claimed in claim 1, in which said metal bellows is constructed of a laminated stainless steel plate consisting of two stainless sheets each having about 0.2 mm thickness.

6. A flexible pipe unit as claimed in claim 5, in which the number of ridges of said bellows is 9.

7. A flexible pipe unit as claimed in claim 5, in which the number of ridges of said bellows is 8.

8. A flexible pipe unit as claimed in claim 1, in which said spring member is arranged to permit an axial displacement of said outer case relative to said bellows against a biasing force produced by said spring member.

9. A flexible pipe unit as claimed in claim 8, in which said spring member is arranged to bias said outer case in an axial direction relative to said bellows.

10. A flexible pipe unit as claimed in claim 9, in which said spring member is one of a cylindrical spring, a conical spring and a circular plate spring, said spring member being coaxially disposed in said cylindrical space defined between the cylindrical outer case and said metal bellows.

11. A flexible pipe unit as claimed in claim 10, in which said outer case has spiral grooves, and in which said cylindrical spring or said conical spring has spiral end elements received in said spiral grooves.

12. A flexible pipe unit as claimed in claim 10, further comprising a stopper element, wherein the stopper element suppresses excessive axial movement of said outer case relative to said bellows.

13. A flexible pipe unit as claimed in claim 12, in which said stopper element includes:

a first projection formed on an inner surface of said outer case; and a second projection formed on said metal bellows, wherein said first and second projections are spaced from each other under a normal condition of the flexible pipe unit.

14. A flexible pipe unit as claimed in claim 10, in which one end of said spring member is connected to the open end of said bellows through spring catchers welded to said open end, and in which the other end of said spring member is connected to the outer case through spring catchers welded to said outer case.

15. A flexible pipe unit as claimed in claim 10, in which said circular plate spring is produced by making round cuts in a circular steel plate and pulling outer and inner portions of said steel plate in opposite directions.

16. A flexible pipe unit as claimed in claim 10, in which said circular plate spring is constructed of a steel plate and comprises:

an annular base part; and equally spaced blade parts which are raised from said annular base part, the raised blade parts having mutually converging upper ends.

17. A flexible pipe unit as claimed in claim 10, in which said circular plate spring is constructed of a steel plate and comprises:

an annular base part;

equally spaced blade parts which are raised from said annular base part, the raised blade parts having mutually receding upper ends.

18. A flexible pipe unit as claimed in claim in which the one of said first and second structures further comprises a spring holder welded to the rear open end of said bellows, in which said spring holder has a raised part against which one end of said spring member aubts, and in which the other end of said spring member abuts against an inwardly projected rear end of said outer case.

19. A flexible pipe unit as claimed in claim 18, in which the end of said spring member is welded to said raised part and the other end of said spring member is welded to said inwardly projected rear end.

20. A flexible pipe unit as claimed in claim 18, in which the end of said spring member is welded to said raised part and the other end of said spring member slides on an inner surface of said outer case.

21. A flexible pipe unit as claimed in claim 20, further comprising a lubricant member for improving the sliding movement of the end of said spring member.

22. A flexible pipe unit as claimed in claim 18, in which the end of said spring member slides on an outer surface of said metal bellows and the other end of said spring member is welded to said inwardly projected rear end.

23. A flexible pipe unit as claimed in claim 22, further comprising a lubricant member for improving the sliding movement of the end of said spring member.

24. A flexible pipe unit as claimed in claim 18, in which said first structure includes an annular front cover through which the front end of said outer cover is secured to the front end of said bellows.

25. A flexible pipe unit as claimed in claim 24, in which said annular front cover is welded to both said front end of said outer cover and the front end of said bellows.

26. A flexible pipe unit disposable between aligned first and second exhaust pipes of an internal combustion engine, comprising:

a metal bellows having a front open end adapted to be connected to said first exhaust pipe and a rear open end adapted to be welded to said second exhaust pipe;

a cylindrical outer metal case coaxially disposed about said bellows to define therebetween a cylindrical space;

an annular front cover extending between the front open end of said bellows and a front end of said outer case to achieve a united connection therebetween;

a spring holder welded to the rear open end of said bellows;

a coil spring having one end held by said spring holder and the other end held by a rear end of said outer case; and an inner pipe coaxially extending in said bellows from one of the front and rear open ends of the bellows toward the other open end leaving a certain space between the leading end of the inner pipe and the other open end thereby causing a cylindrical chamber defined between said bellows and said inner pipe to serve as a resonance chamber.

27. A flexible pipe unit disposable between aligned first and second exhaust pipes of an internal combustion engine, comprising:

a metal bellows having a front open end adapted to be connected to said first exhaust pipe and a rear open end adapted to be welded to said second exhaust pipe;

a cylindrical outer metal case coaxially disposed about said bellows to define therebetween a cylindrical space;

first and second spring holders welded to the front and rear open ends of said bellows respectively;

a first coil spring having one end held by said first spring holder and the other end held by a front end of said outer case;

a second coil spring having one end held by said second spring holder and the other end held by a rear end of said outer case; and an inner pipe coaxially extending in said bellows from one of the front and rear open ends of the bellows toward the other open end leaving a certain space between the leading end of the inner pipe and the other open end thereby causing a cylindrical chamber defined between said bellows and said inner pipe to serve as a resonance chamber.

\* \* \* \* \*